(12) United States Patent
Sunde et al.

(10) Patent No.: US 12,552,422 B2
(45) Date of Patent: Feb. 17, 2026

(54) ELASTOMER CUSHION UNIT FOR RAILCAR

(71) Applicant: Strato Technology Solutions, LLC, Saginaw, TX (US)

(72) Inventors: Jonathan Sunde, Fort Worth, TX (US); Michael E. Ring, Lake Village, IN (US); Brian Cunkelman, Blairsville, PA (US)

(73) Assignee: Strato Technology Solutions, LLC, Saginaw, TX (US)

( * ) Notice: Subject to any disclaimer, the term of this patent is extended or adjusted under 35 U.S.C. 154(b) by 690 days.

(21) Appl. No.: 17/939,683

(22) Filed: Sep. 7, 2022

(65) Prior Publication Data

US 2024/0092404 A1    Mar. 21, 2024

(51) Int. Cl.
    *B61G 11/08*      (2006.01)
    *B61G 11/00*      (2006.01)
    (Continued)

(52) U.S. Cl.
    CPC .............. *B61G 11/08* (2013.01); *B61G 11/00* (2013.01); *B61G 11/02* (2013.01); *B61G 11/04* (2013.01); *B61G 11/10* (2013.01); *B61G 11/18* (2013.01)

(58) Field of Classification Search
    CPC ......... B61G 11/08; B61G 11/00; B61G 11/02; B61G 11/04; B61G 11/10; B61G 11/18
    (Continued)

(56) References Cited

U.S. PATENT DOCUMENTS

| 2,469,126 A | 5/1949 | Munro et al. |
| 2,559,743 A | 7/1951 | Williams |

(Continued)

FOREIGN PATENT DOCUMENTS

| DE | 2631815 A1 * | 1/1978 | |
| DE | 19728421 A1 * | 1/1999 | ............ B61G 11/04 |

(Continued)

OTHER PUBLICATIONS

International Search Report for Corresponding PCT Application No. PCT/US2018061286 Dated Jan. 25, 2019.

(Continued)

*Primary Examiner* — S. Joseph Morano
*Assistant Examiner* — James William Jones
(74) *Attorney, Agent, or Firm* — AP Patents; Alexander Pokot

(57) ABSTRACT

A cushioning device includes a first housing with a first wall, a first extremity, a first open end and a first hollow interior. A second housing includes a second wall, a second extremity, a second open end and a second hollow interior, the second hollow interior sized to receive the first wall therewithin. A spring is disposed within each of the first and second hollow interiors between the first extremity and the second extremity. The first and the second housings are designed for a reciprocal linear movement relative to each other between a first position where the first open end being disposed at a distance from the second extremity and a second position where the first open end being disposed in a direct contact with the second extremity. The cushioning device may be installed within a sill of a railcar to cushion buff or draft forces from a coupler.

27 Claims, 20 Drawing Sheets

(51) Int. Cl.
*B61G 11/02* (2006.01)
*B61G 11/04* (2006.01)
*B61G 11/10* (2006.01)
*B61G 11/18* (2006.01)

(58) Field of Classification Search
USPC .............................. 213/222, 220, 267, 221
See application file for complete search history.

(56) References Cited

U.S. PATENT DOCUMENTS

| | | |
|---|---|---|
| 2,728,465 A | 12/1955 | Campbell |
| 2,766,894 A | 10/1956 | Campbell |
| 2,825,472 A | 3/1958 | Peterson |
| 3,197,037 A * | 7/1965 | Wilson ..................... B61G 7/10 |
| | | 213/21 |
| 3,370,718 A | 2/1968 | Waddell |
| 3,489,295 A | 1/1970 | Hartel |
| 3,493,221 A | 2/1970 | Mozdzanowski |
| 3,536,314 A | 10/1970 | Tonne et al. |
| 3,800,961 A | 4/1974 | Hawthorne |
| 3,838,778 A | 10/1974 | Appleton |
| 4,262,887 A | 4/1981 | Jansen |
| 4,348,015 A | 9/1982 | Domer |
| 5,312,007 A | 5/1994 | Kaufhold et al. |
| 5,487,480 A | 1/1996 | Page et al. |
| 6,360,906 B1 * | 3/2002 | Kaufhold .................. B61G 9/06 |
| | | 213/32 C |
| 6,446,820 B1 | 9/2002 | Barker et al. |
| 6,681,943 B2 | 1/2004 | Barker et al. |
| 7,258,243 B2 | 8/2007 | Ring et al. |
| 7,857,273 B2 | 12/2010 | Sprainis et al. |
| 8,096,432 B2 | 1/2012 | Sprainis et al. |
| 8,136,457 B2 | 3/2012 | Sammartino |
| 8,136,683 B2 | 3/2012 | Sprainis et al. |
| 8,528,483 B2 | 9/2013 | Sprainis et al. |
| 8,582,483 B1 | 11/2013 | Yu et al. |
| 8,590,717 B2 | 11/2013 | Wilt et al. |
| 8,714,377 B2 | 5/2014 | Peckham |
| 8,870,002 B2 | 10/2014 | Wilt et al. |
| 8,939,300 B2 | 1/2015 | Wil et al. |
| 8,985,355 B2 | 3/2015 | Wilt |
| 9,056,618 B2 | 6/2015 | Gagliardino et al. |
| D781,179 S | 3/2017 | Schoedl et al. |
| 9,598,092 B2 | 3/2017 | James et al. |
| 9,669,848 B2 | 6/2017 | Creighton et al. |
| 9,789,888 B2 | 10/2017 | Wilt et al. |
| 9,868,453 B2 | 1/2018 | Johnson et al. |
| 10,011,288 B2 | 7/2018 | Gagliardino et al. |
| 10,086,852 B2 | 10/2018 | Iler |
| 10,308,263 B1 | 6/2019 | Ring et al. |
| 10,513,275 B2 | 12/2019 | Ring et al. |
| 11,117,600 B2 | 9/2021 | Sunde et al. |
| 11,142,228 B2 | 10/2021 | Sunde et al. |
| 2002/0070189 A1 * | 6/2002 | Barker ..................... B61G 9/06 |
| | | 213/62 R |
| 2005/0155947 A1 * | 7/2005 | Sommerfeld ............ B61G 9/22 |
| | | 213/75 R |
| 2006/0043044 A1 * | 3/2006 | Ring ........................ B61G 9/06 |
| | | 213/75 R |
| 2008/0008225 A1 | 1/2008 | Ahmad et al. |
| 2008/0011700 A1 * | 1/2008 | Brough .................... B61G 9/24 |
| | | 213/75 R |
| 2008/0272517 A1 * | 11/2008 | Sprainis .................. B61G 9/10 |
| | | 264/319 |
| 2012/0118847 A1 * | 5/2012 | Carlstedt .................. B61G 9/06 |
| | | 29/446 |
| 2013/0270210 A1 | 10/2013 | Kukulski et al. |
| 2015/0251671 A1 | 9/2015 | Iler |
| 2015/0307115 A1 | 10/2015 | Wang et al. |
| 2017/0080956 A1 | 3/2017 | James et al. |
| 2017/0166225 A1 | 6/2017 | Schoedl et al. |
| 2017/0210398 A1 | 7/2017 | Wilt et al. |
| 2017/0334469 A1 * | 11/2017 | Johnson ................... B61G 3/06 |
| 2018/0065649 A1 * | 3/2018 | Clark ....................... B61G 9/04 |
| 2018/0118235 A1 | 5/2018 | Johnson et al. |
| 2019/0144015 A1 | 5/2019 | Ring et al. |
| 2019/0178754 A1 | 6/2019 | Zhang et al. |
| 2020/0339164 A1 | 10/2020 | Johnson et al. |
| 2020/0385033 A1 | 12/2020 | Schoedl et al. |
| 2021/0284205 A1 | 9/2021 | Aleynikov |
| 2021/0331721 A1 | 10/2021 | Kries et al. |
| 2022/0212699 A1 | 7/2022 | Shoup et al. |

FOREIGN PATENT DOCUMENTS

| | | |
|---|---|---|
| GB | 919899 | 2/1963 |
| KR | 102121368 B1 * | 6/2020 |

OTHER PUBLICATIONS

International Search Report and Written Opinion of Corresponding PCT Application No. PCT/US19/63837 Dated Feb. 18, 2020.
International Search Report and Written Opinion of Corresponding PCT Application No. PCT/US19/66441 Dated Feb. 14, 2020.
PCT Search Report for Application No. PCT/US2020/027645 Dated Jun. 19, 2020.

* cited by examiner

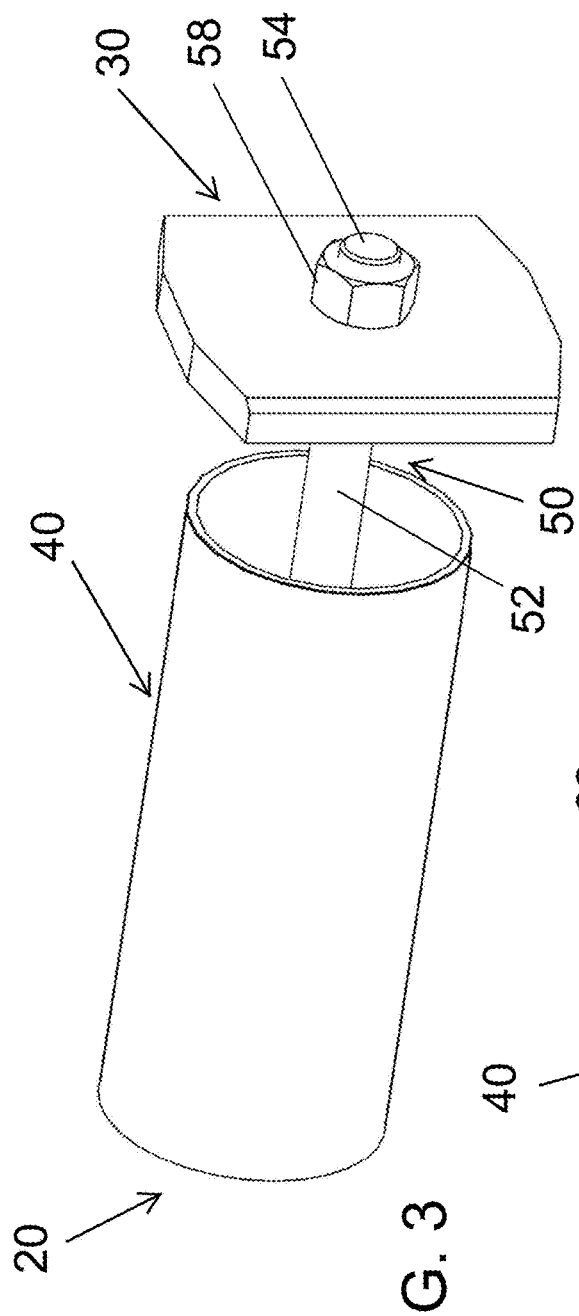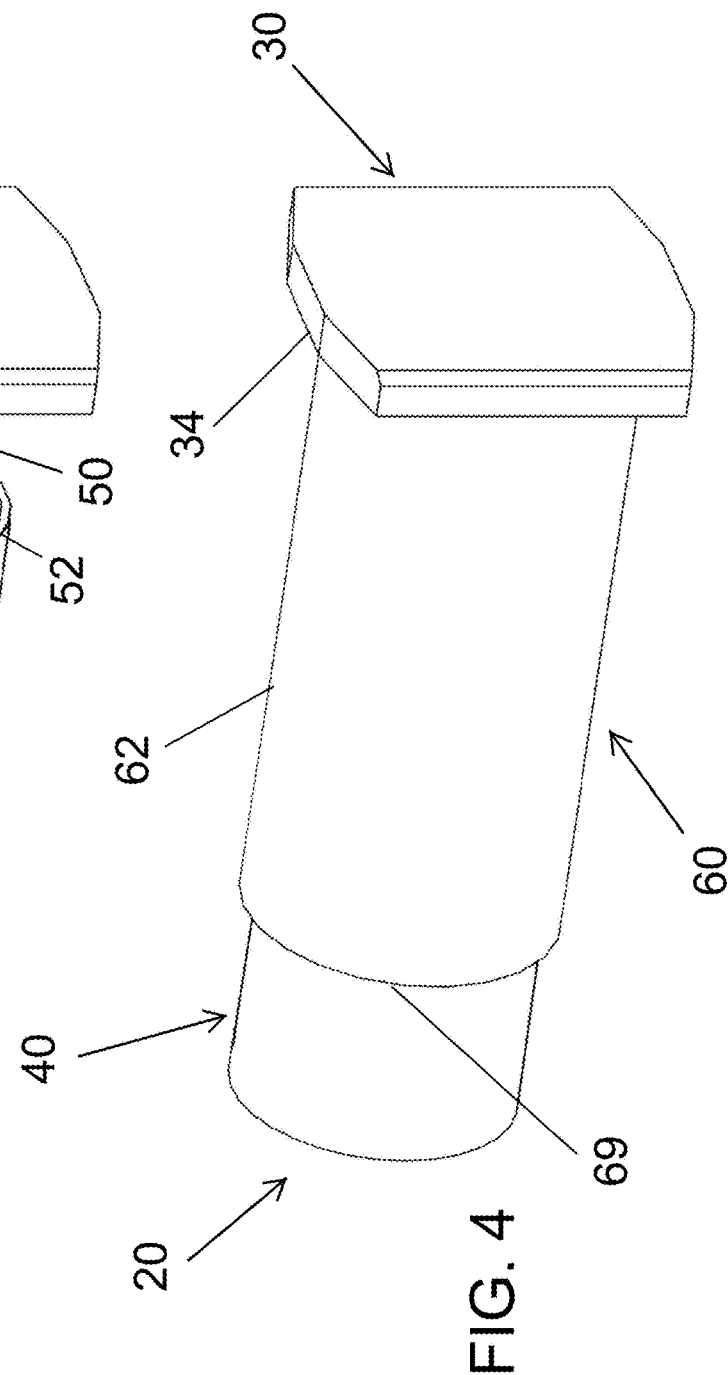

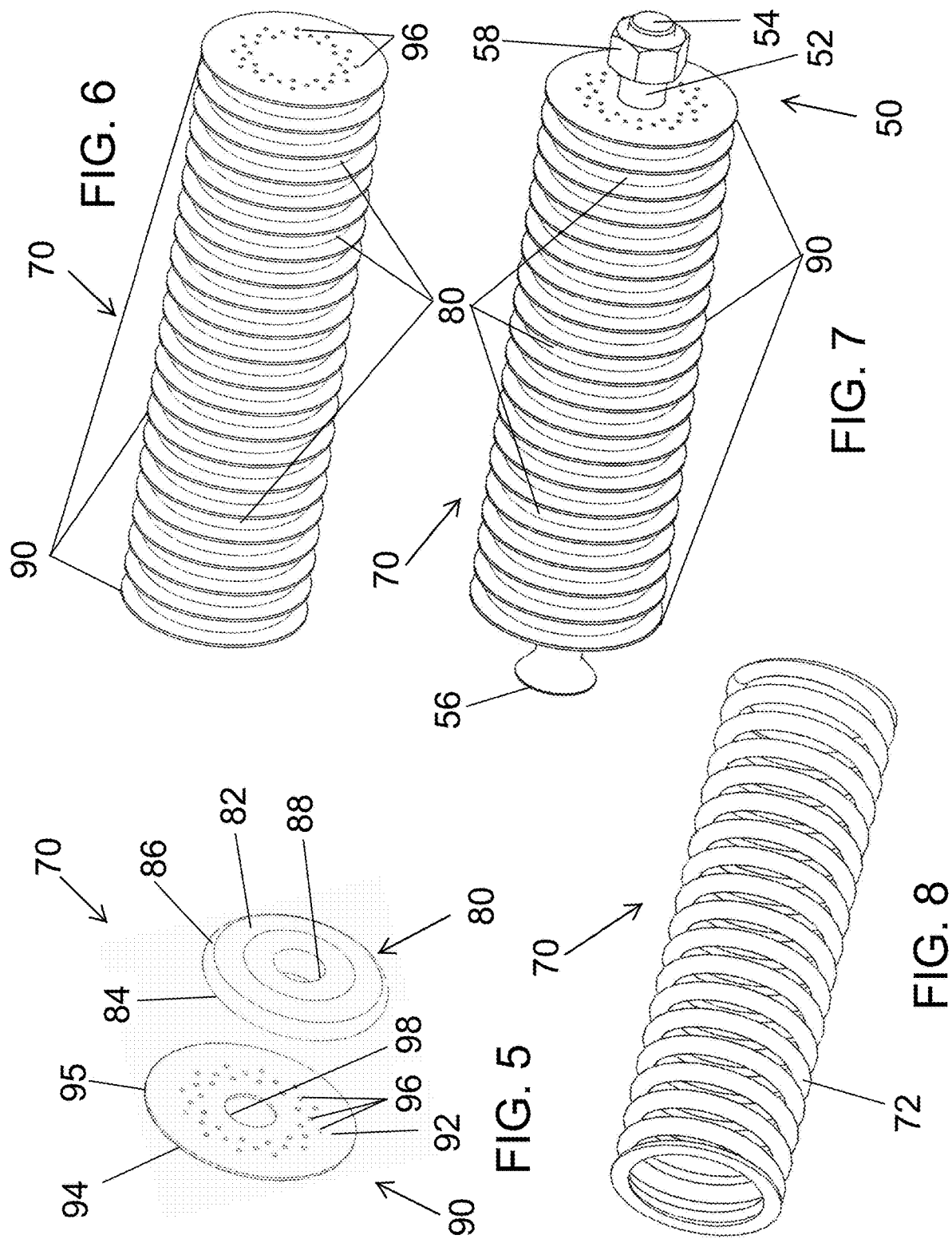

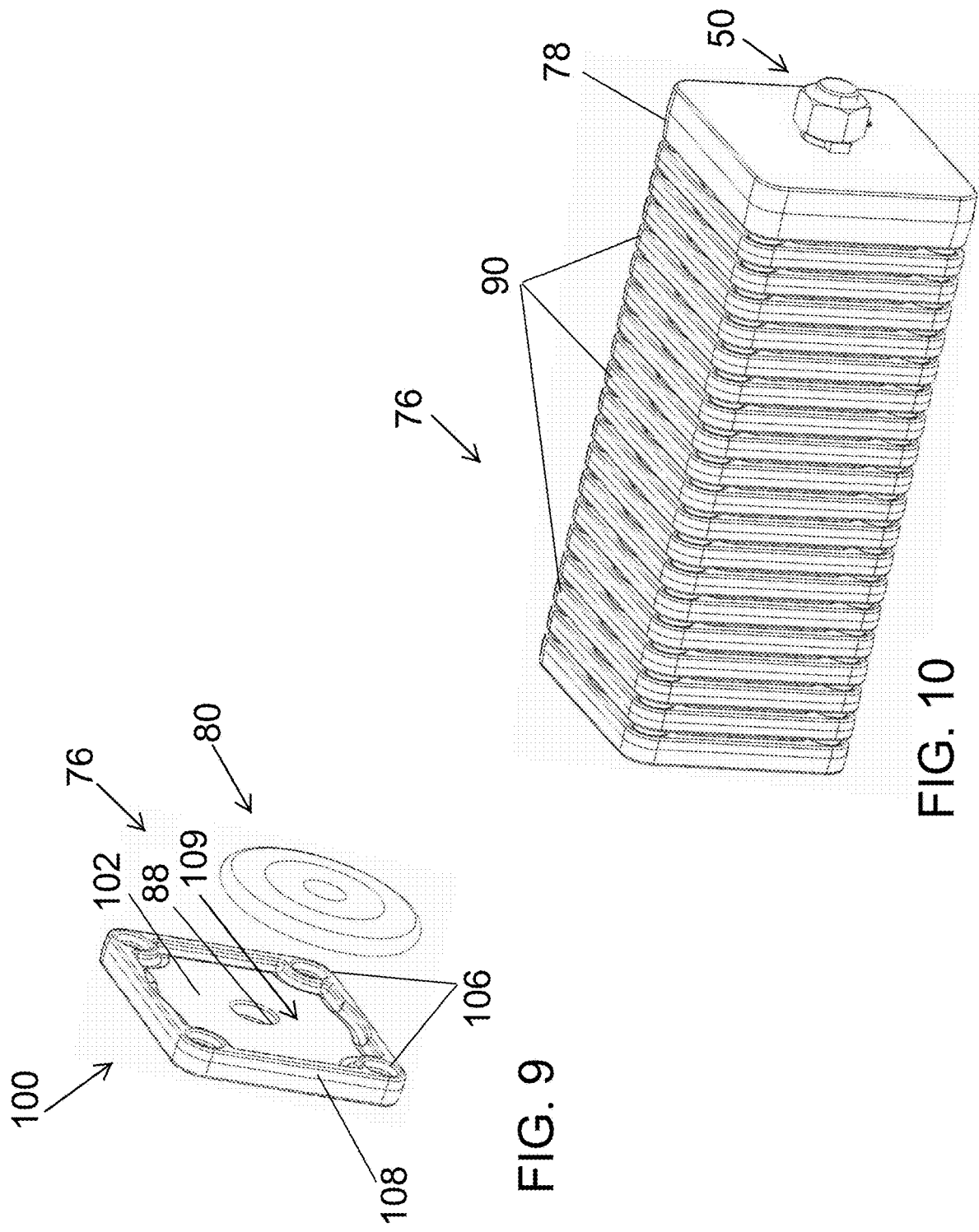

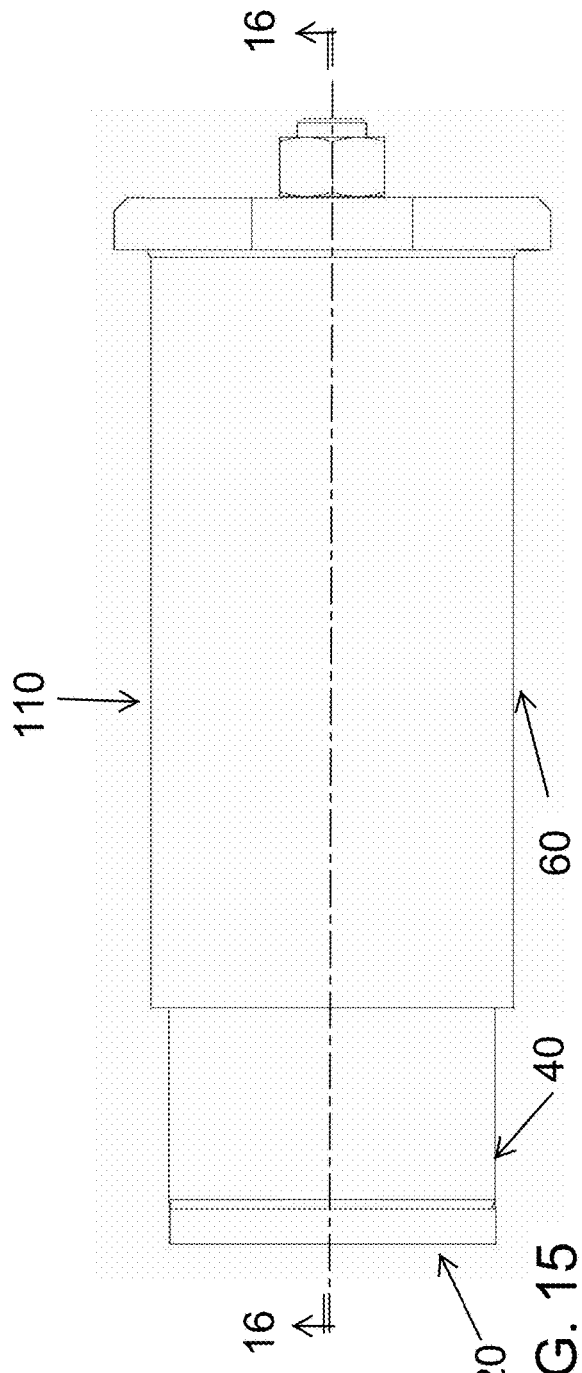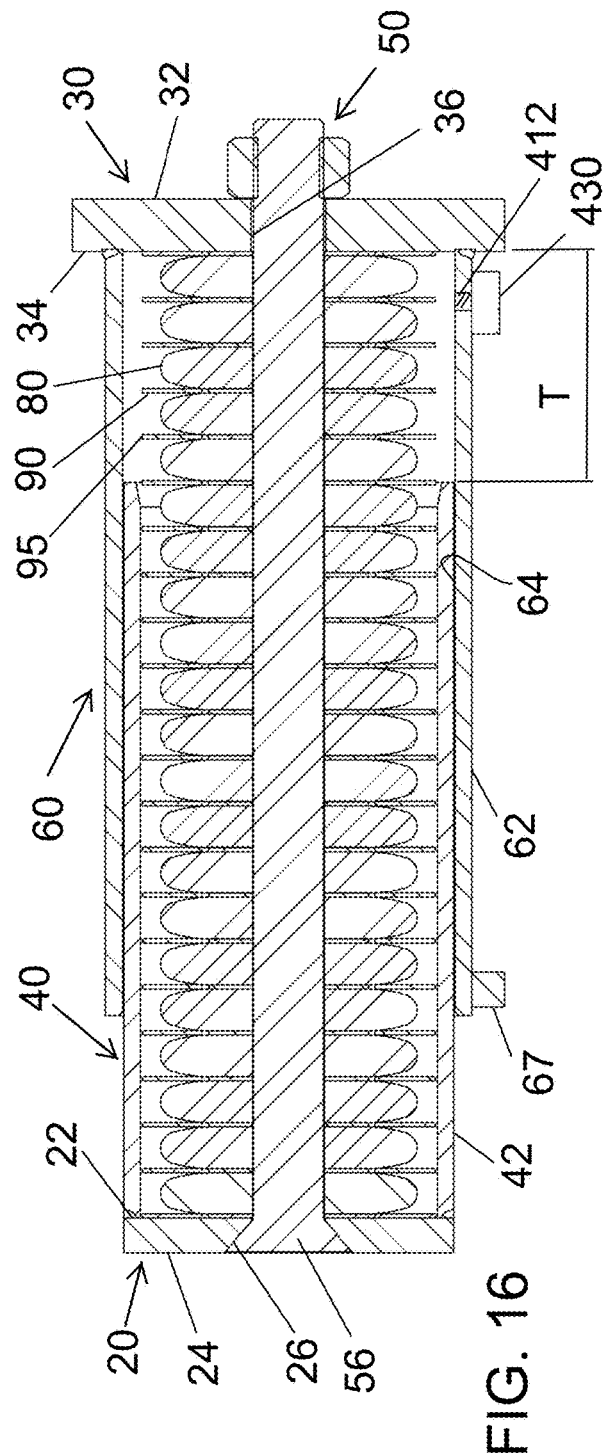
FIG. 15
FIG. 16

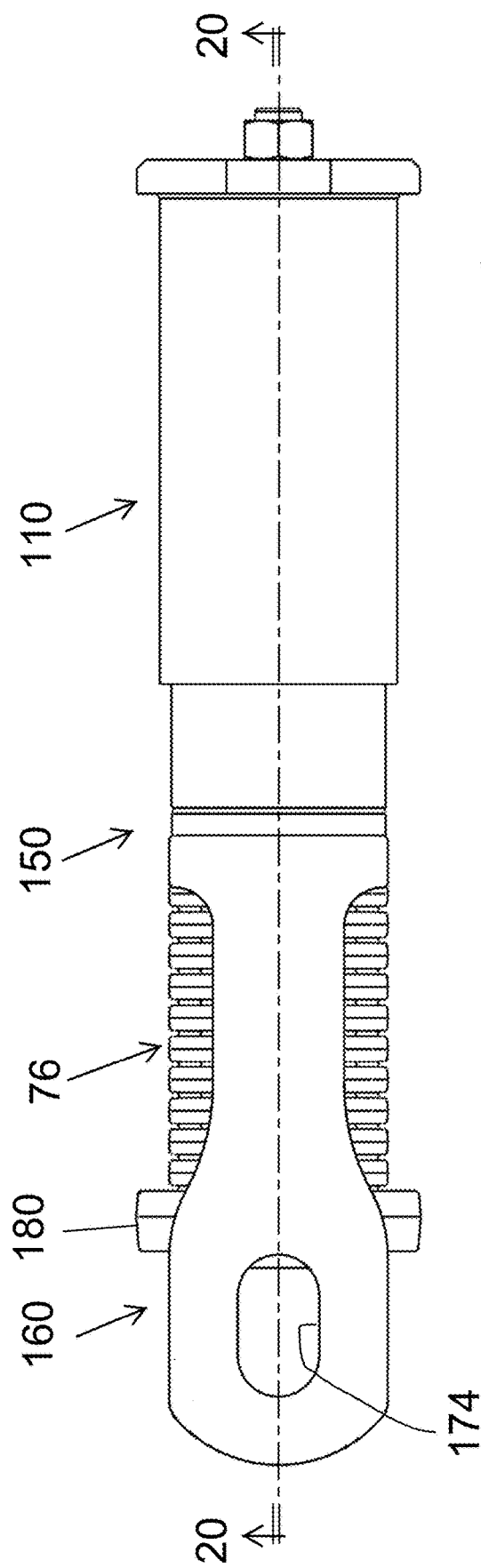
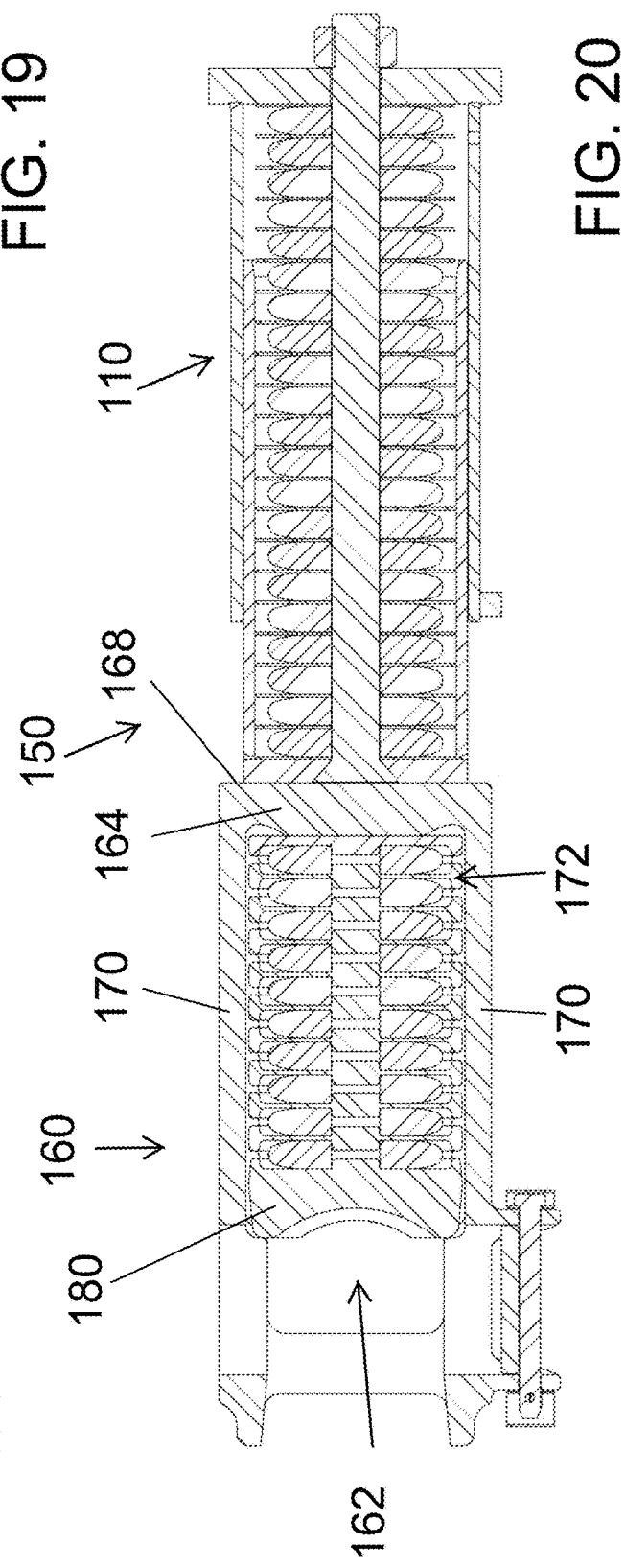

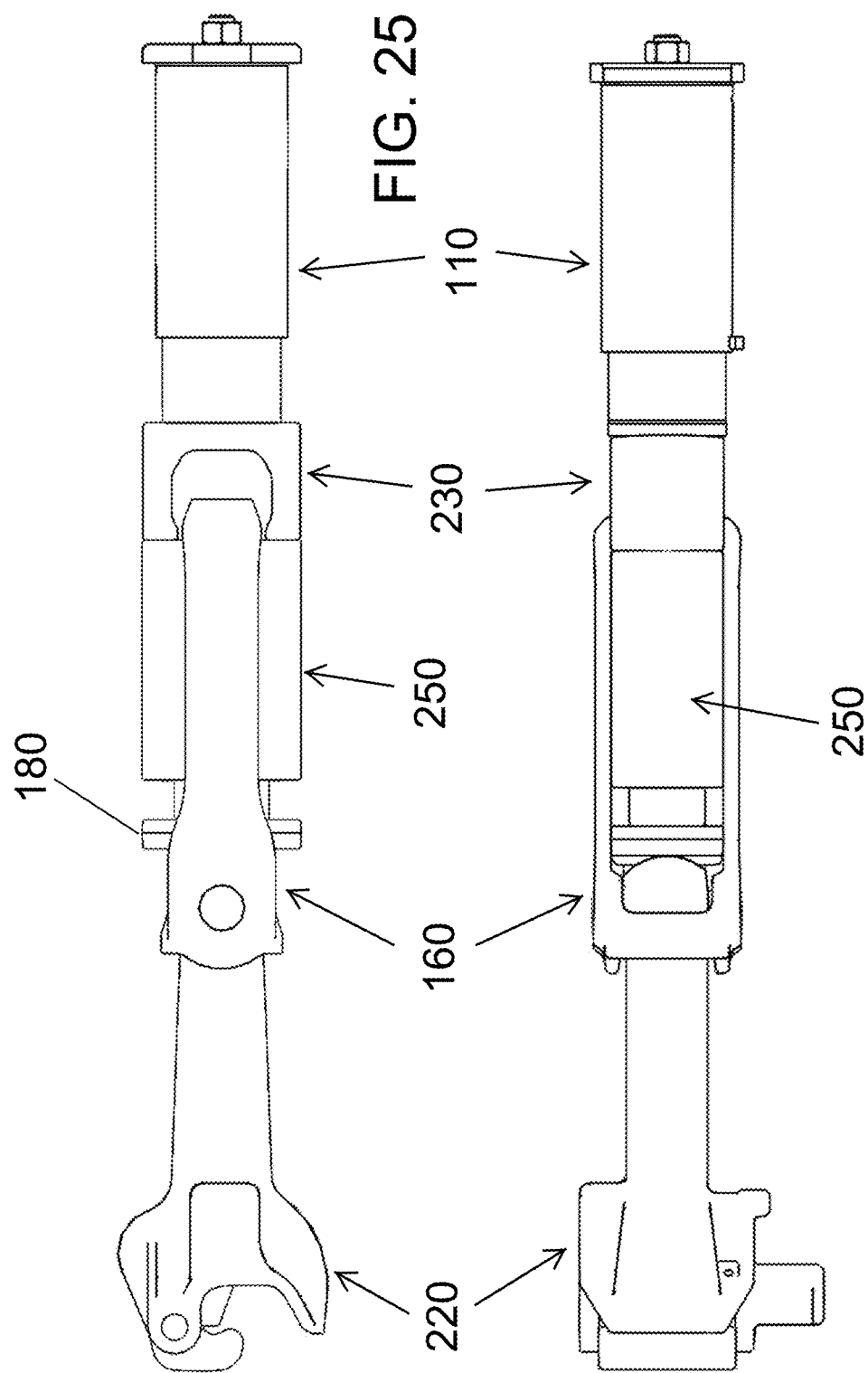

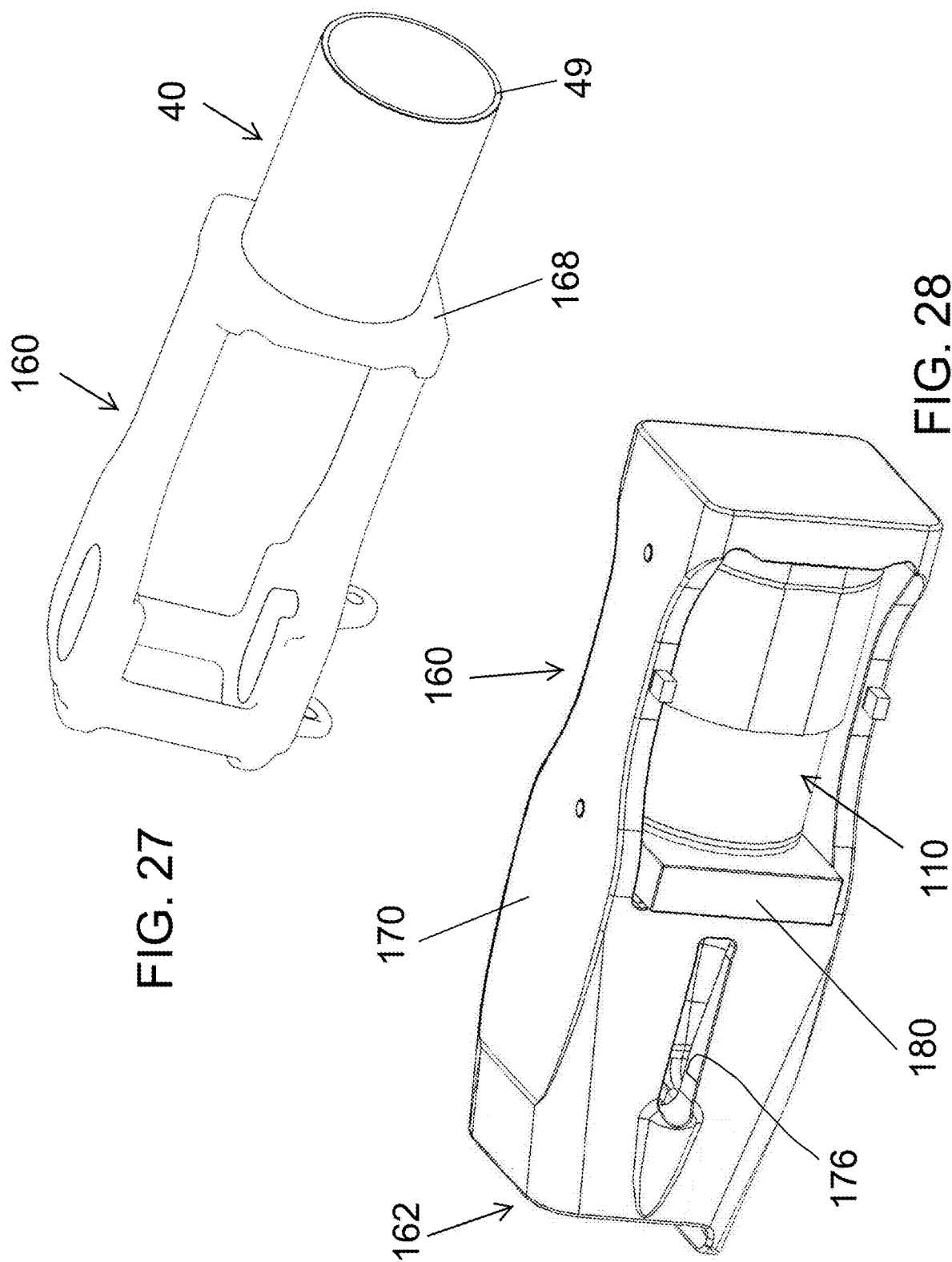

ELASTOMER CUSHION UNIT FOR RAILCAR

CROSS-REFERENCE TO RELATED APPLICATIONS

N/A

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

TECHNICAL FIELD

The subject matter relates to a spring. The subject matter may be related to a spring that cushions buff loads in railway applications. The subject matter may be related to a cushioning device with an elastomeric spring that cushions buff loads in railway applications. The subject matter may be related to a cushioning device with an elastomeric spring that cushions buff and draft loads in railway applications.

BRIEF DESCRIPTION OF THE DRAWINGS

The accompanying drawings are incorporated in and constitute part of the specification and illustrate various embodiments. In the drawings:

FIG. 3 illustrates a perspective view of a device;
FIG. 4 illustrates a perspective view of a device;
FIG. 5 illustrates a perspective view of a spring;
FIG. 6 illustrates a perspective view of a spring;
FIG. 7 illustrates a perspective view of a spring;
FIG. 8 illustrates a perspective view of a spring;
FIG. 9 illustrates a perspective view of a spring;
FIG. 10 illustrates a perspective view of a spring;
FIG. 15 illustrates a top view of the device with the spring of FIG. 13;
FIG. 16 illustrates a cross-sectional view of the device of FIG. 15 along lines 16-16;
FIG. 19 illustrates a top view of a cushioning device with the spring;
FIG. 20 illustrates a cross-sectional view of the device of FIG. 19 along lines 20-20;
FIG. 25 illustrates a top view of a cushioning device with a railcar coupler;
FIG. 26 illustrates a front view of a cushioning device with a railcar coupler;
FIG. 27 illustrates a yoke for a railcar;
FIG. 28 illustrates a perspective view of a cushioning device.

DETAILED DESCRIPTION

Figure 1:
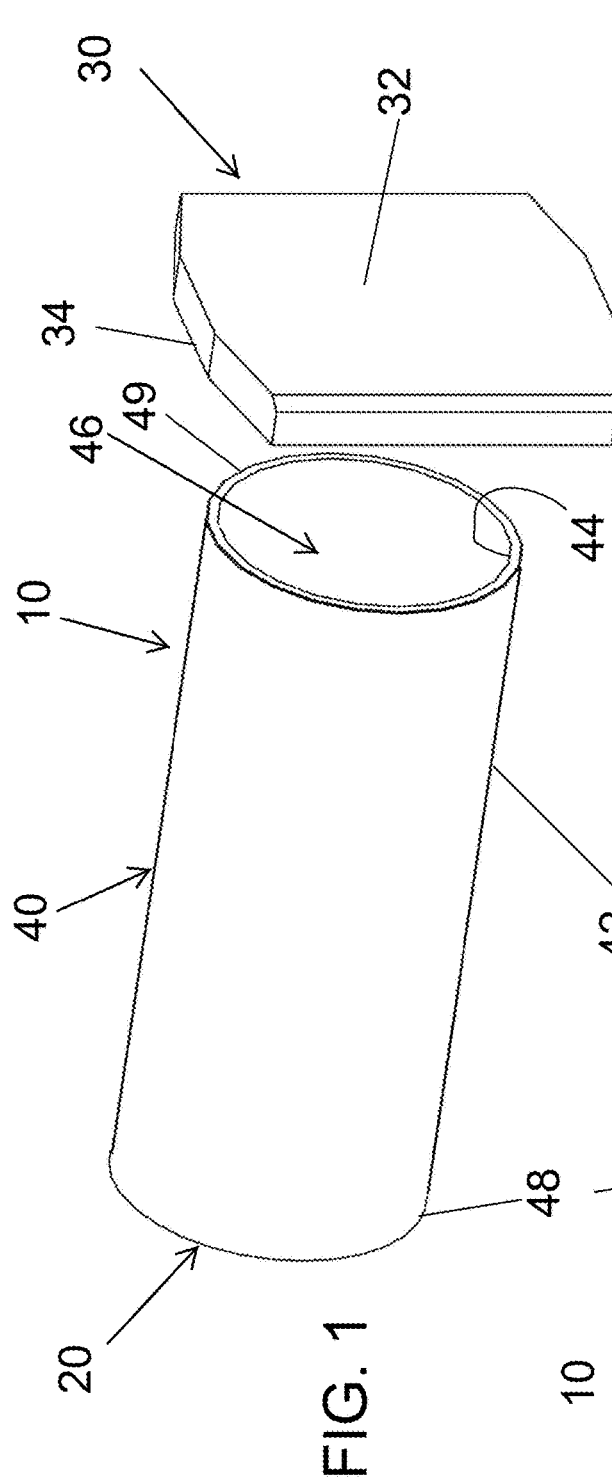
FIG. 1 illustrates a perspective view of a device.

Prior to proceeding to the more detailed description of the present subject matter, it should be noted that, for the sake of clarity and understanding, identical components which have identical functions have been identified with identical reference numerals throughout the several views illustrated in the drawing figures.

It is to be understood that the singular forms "a," "an," and "the" include plural referents unless the context clearly dictates otherwise or expressly specified otherwise. Thus, for example, reference to "a component surface" includes reference to one or more of such surfaces.

For purposes here, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives.

The verb "may" is used to designate optionality/noncompulsoriness. In other words, something that "may" can, but need not.

Before elucidating the subject matter shown in the Figures, the present disclosure will be first described in general terms.

A housing comprises a first extremity, a second extremity and a wall. The second extremity is disposed opposite the first extremity along a length of the device between first and second extremities. The second extremity is disposed at a distance from the first extremity along the length. The wall extends along the length. The wall defines a hollow interior.

The first extremity may be designed as a plate shaped component with a first surface and a second surface that is spaced apart from the first surface to define a thickness of the plate shaped component.

The first surface may be flat, except for manufacturing tolerances. In other words, the first surface may be generally or substantially flat. The first surface may be designed as a convex or a concave surface. The first surface may be designed as a combination of a flat and a convex and/or concave surface portions. The first surface may be smooth, except for manufacturing tolerances. In other words, the second surface may be generally or substantially flat.

The second surface may be flat, except for manufacturing tolerances. In other words, the second surface may be generally or substantially flat. The second surface may be designed as a convex or a concave surface. The second surface may be designed as a combination of a flat and a convex and/or concave surface portions. The second surface may be smooth, except for manufacturing tolerances. In other words, the second surface may be generally or substantially flat.

The first extremity may be designed with one or more apertures through the thickness. Aperture may be a round aperture. Aperture may be an elongated aperture. Aperture may have other shape. The first extremity may be designed with one or more cavities (bores) in the first surface. The first extremity may be designed with one or more projections on the first surface. The projection is a feature that extends outwardly from the first surface. The projection may be an elongated projection. The projection may be referred to as an abutment. The first extremity may be also designed with one or more cavities (bores) in the second surface. The first extremity may be also designed with one or more projections on the second surface.

First extremity may define an edge surface between the first and second surfaces. The edge surface may have a round shape in a direction normal to the length of the device. The edge surface may have a square shape in the direction normal to the length of the device. The edge surface may have a rectangular shape in the direction normal to the length of the device. The edge surface may be designed as a combination of straight and curved portions in the direction normal to the length of the device. The edge surface may be designed as a flat edge surface between the first and second surfaces. The edge surface may be designed as a curved edge surface between the first and second surfaces. The curved surface may be one of a convex, concave and a combination thereof. The edge surface may be designed with one or more cavities and/or one or more projections.

The first extremity may be solid throughout the thickness. The first extremity may be designed with one or more voids within the thickness. The void may be a hole through a thickness of the first extremity. The void may be an indentation in a surface of the first extremity. The one or more voids may reduce weight of the first extremity.

The first extremity may be manufactured from metal. In other words, the first extremity may comprise metal. Metal may be steel. Metal may be aluminum. Metal may be titanium. Metal may be a combination of any of metal, aluminum, and titanium. The first extremity may be manufactured from a polymer material. In other words, the first extremity may comprise polymer. Polymer may be a carbon fiber. The first extremity may comprise a combination of metal and polymer.

The second extremity may be designed as the above described first extremity.

The wall has a first edge and a second edge. The second edge is disposed at a distance from the first edge along a length of the wall and along the length of the device. As it will be explained further in this document, the length of the wall is sized smaller than the distance between the first and second extremities.

The wall has an interior surface and an exterior surface that define a thickness of the wall. The thickness of the wall may be identical throughout a length of the wall. In other words, the wall may be straight.

The wall may be sized smaller than a size of the first extremity in the direction normal to the length of the device. The wall and the first extremity may be sized and shaped so that the first extremity is received within the hollow interior, thus closing one edge of the wall.

The wall may be simply disposed between the first and second extremities without a rigid connection with the first and/or second extremities.

The wall may be rigidly attached to the first proximity or in the rigid connection with the first proximity. The wall may be welded to the first proximity at the first edge. The first edge may be bonded, either permanently or detachably to the first proximity. This edge may be referred to as a proximal edge. When the wall is rigidly attached to the first extremity, the first edge will be positioned at or on the first extremity. The wall and the first extremity may be provided as a one-piece unitary component by a casting or a molding process, depending on the material of the wall. When the wall is rigidly attached to the first extremity, the opposite edge of the wall may define an open end of the housing and the first extremity may define a closed end of the housing.

The wall may be solid throughout. The wall may have one or more apertures through a thickness of the wall. Aperture may be a round aperture. Aperture may be an elongated aperture. Aperture may have other shape. The wall may have one or more voids though the thickness of thew wall. The void may be an indentation in a surface of the wall. The void may be in an open communication with an edge of the wall. The one or more voids may reduce weight of the wall.

The wall may comprise metal. Metal may be steel. Metals may be aluminum. Metal may be a combination of metal and aluminum. The wall may comprise polymer. Polymer may be carbon fiber. The wall may comprise a combination of metal and polymer.

The wall may comprise a circular cross-section in the plane normal to the length of the device. The wall may comprise a rectangular cross-section in the plane normal to the length of the device. The wall may comprise a square cross-section in the plane normal to the length of the device.

Since the length of the wall is sized smaller than the length of the device between the first and second extremities, the second edge will be disposed at a distance from the second extremity. However, it will be understood that the position of the first and second extremities can be reversed and the wall may be rigidly attached to the second extremity and disposed at a distance from the first extremity.

The first and second extremities may be provided without any direct or indirect attachment to each other.

The first and second extremities may be detachably attached to each other at the distance from each other as described above. Here, the first and the second extremities may be provided with aligned apertures through a thickness of each extremity with an elongated component passing through the aligned apertures.

The elongated component may have each end portion designed with an external thread to receive a threaded nut. In this design, the threaded nut may contact the respective extremity. The elongated component may have each end portion designed with an external thread to engage a threaded aperture within an extremity.

The external thread may be along an entire length of the elongated component. Such elongated component may be referred to as a bolt.

The elongated component may be designed with an abutment on one end and an external thread on an opposite end. The abutment may be designed to contact a surface of the extremity. The abutment may be designed to fit within the aperture and within the thickness of the respective extremity and be generally flush with the surface of such extremity. In this design, the edge of such aperture may be tapered to receive a complimentary tapered abutment. A length of the elongated component is then sized so that the threaded end protrudes past the opposite extremity to receive the threaded nut, thus detachably attaching the first extremity to the second extremity.

The terminal edge surface of the threaded end or of the threaded end portion may define the extremity of the device.

The elongated component, as described above, may be referred to as a rod.

The first and second extremities may be permanently attached to each other at the distance from each other as described above. The elongated component may be welded or bonded to each extremity to maintain a distance between the two extremities. Each end of the elongated component may be in a direct contact with a surface of the respective extremity. Each end of the elongated component may be received within the aperture of the respective extremity. One end of the elongated component may be received within the aperture of one extremity and the opposite end of the elongated component may be disposed at a surface of the opposite extremity.

The housing may be designed with another wall. The two walls may be referred to each other as one wall and another wall, as a first wall and a second wall or as a first wall portion and a second wall portion.

The first wall may be in a rigid connection with a first extremity and the second wall may be in a rigid connection with the second extremity.

A combination of the first extremity and the first wall may be referred to as a first housing or as a first housing portion. A combination of the second extremity and the second wall may be referred to as a second housing or as a second housing portion. In this design, the first extremity may define a first closed end of the housing and the second extremity may define a second closed end of the housing. A distal end of the first wall may define a first open end of the housing and a distal end of the second wall may define a second open end of the housing.

The first wall may be sized smaller than the second wall so that the first wall is received within a hollow interior of the second wall. The first housing may be configured to move, in a reciprocal linear manner, within the hollow interior of the second housing. In this design, a peripheral gap may be provided between an exterior surface of the first wall and an interior surface of the second wall. The gap may be sized to allow a movement of the first housing within the second housing without friction, thus providing a loose fit. The gap may be sized to allow a contact between the exterior surface of the first housing and the interior surface of the second housing but enabling the movement. A length of the first wall is sized to dispose the distal end of the first housing at a first distance from the second extremity and a length of the second wall is sized to dispose the distal end of the second housing at a second distance from the first extremity. The first and the second distances may be equal to each other. The first and the second distances may differ from each other. The first and second housings may be attached therebetween with the elongated component, as described above.

The first wall may comprise a cavity in the thickness of the first wall, the cavity exposed from an exterior surface of the first wall. The housing may then comprise a lubricating insert positioned within the cavity. The lubricating insert may be a polymer. The lubricating insert may be a metal impregnated with a lubricant.

The first wall may comprise a cavity in the thickness of the first wall, the cavity exposed from an exterior surface of the first wall. The housing may then comprise a wear insert positioned within the cavity. The wear insert may be a polymer. The wear insert may be a metal. The wear insert may be a polymer.

The second wall may comprise a cavity in the thickness of the second wall, the cavity exposed from an interior surface of the second wall. The housing may then comprise a lubricating insert positioned within the cavity. The lubricating insert may be a polymer. The lubricating insert may be a metal impregnated with a lubricant.

The second wall may comprise a cavity in the thickness of the second wall, the cavity exposed from an interior surface of the second wall. The housing may then comprise a wear insert positioned within the cavity. The wear insert may be a polymer. The wear insert may be a metal. The wear insert may be a polymer.

The housing may comprise a liner between an exterior surface of the first wall and an interior surface of the second wall. The liner may comprise a polymer material. This liner may be referred to as a lubricating liner.

The first wall may be sized identical, except for manufacturing tolerances, to the second wall. In this design, a distal end of the first wall will be disposed at a distance from a distal end of the second wall. The first and second housings in this design may be attached therebetween with the elongated component, as described above.

The housing may be designed with three walls that are disposed in a series with each other along the length of the device. Middle housing from the three housing may have a flange on an exterior surface. The flange may be provided as one or more projections. The flange may extend throughout a peripheral surface portion of the middle housing.

The housing may be referred to as a casing. The housing may be referred to as a device. The wall may be referred to as a sleeve.

A spring may comprise a pad and a plate that are positioned in a surface-to-surface contact with each other. A spring may comprise a plurality of pads and a plurality of plates that are positioned in a surface-to-surface contact with each other. The spring may be referred to as an assembly of pads or plates. The spring may be referred to as a spring assembly. The spring, comprising a pad and a plate, may be referred to as an elastomeric unit.

The pad comprises a first surface and a second surface. The second surface is spaced apart from the first surface to define a thickness of the pad. The pad also comprises a peripheral edge surface. The peripheral edge surface may be flat, except for the manufacturing tolerances. The peripheral edge surface may have a convex shape. The pad may comprise a center aperture through the thickness of the pad. The pad is manufactured from an elastomeric material. In other words, the pad comprises elastomeric material. The elastomeric material may be referred to as an elastomer. The pad may have a disk shaped in a plane normal to the thickness of the pad and may be referred to as a disk.

"Elastomer" and "elastomeric" may refer to polymeric materials having elastic properties so that they exert a restoring force when compressed. Examples of such materials may include, without limitation, thermoplastic elastomer (TPE), natural rubbers and synthetic rubbers such as: neoprene, isoprene, butadiene, styrene-butadiene rubber (SBR), polyurethanes, and any derivatives of the above. The material may be a thermoplastic polyester, such as Arnitel®, a thermoplastic copolyester elastomer from DSM and Hytrel®, a thermoplastic polyester from Dupont. The pad may have a Shore D durometer hardness of 40-70.

The pad may be installed in a condition where an initial thickness of the pad is not changed during installation. The pad may be installed under a load where the initial thickness of the pad reduces during installation. The reduced thickness of the pad may define a pre-stressed condition of the pad. The reduced thickness of the pad may define a pre-compressed condition of the pad.

A thickness of the pad prior to installation may be $1^{11}/_{16}$ inches. This thickness may be referred to as an initial thickness of the pad. During installation the pad may be compressed to a thickness of $1^{7}/_{32}$ inches. A force of 32 klb may be required to compress the pad. This thickness may be referred to as a partially compressed thickness. This thickness may be referred to as a pre-compressed thickness. This thickness may be referred to as a pre-stressed thickness. During operation, the thickness may reduce to $7/_{8}$ of an inch. Equivalent thicknesses of the plate may be provided based on a metric system of measurements. This thickness may be referred to as a fully compressed thickness.

The plate comprises a pair of surfaces spaced apart from each other to define a thickness of the plate. Each surface may be a smooth surface. Each surface may be a rough surface. The rough surface may be produced by a shotblasting operation. The rough surface may be produced by a casting process. When the rigid plate is provided with the rough surface, such rough surface increases friction between the surface of the plate and the surface of the pad during radial expansion. Thus, control of radial expansion of the pad may be achieved with the rigid plate having one or both rough surfaces.

The plate may have apertures through the thickness of the plate. The plate may have a center aperture through the thickness of the plate being sized larger than the remaining apertures. The plate may only have a center aperture. The plate may exclude any projections on one or both of the pair of surfaces. The plate may be void of any projections on one or both of the pair of surfaces.

The plate may be provided with through apertures and with one or both rough surfaces.

The plate may have a projection on one or both of the pair of surfaces. The projection may be disposed at an edge of the plate. The projection may be shaped to follow a shape of the peripheral edge of the plate. The projection may be a raised flange that is disposed at the periphery of the plate. The raised flange may define a cavity sized to receive the pad therewithin.

When the plate is provided with apertures through a thickness of the plate, the plate may be designed with projections at some or all apertures. These projections may be sized and shaped (designed or configured) as prongs to penetrate into the thickness of the pad.

The plate may be manufactured from metal. In other words, the plate may comprise metal. Metal may be steel. Metal may be aluminum. Metal may be titanium. Metal may be a combination of any of metal, aluminum, and titanium. The plate may be manufactured from a polymer material. In other words, the plate may comprise a polymer. Polymer may be a carbon fiber. The plate may comprise a combination of metal and polymer. The plate, as described above, is designed as a rigid plate.

A thickness of the plate may be $1/_{8}$ of an inch. A thickness of the plate may be $3/_{16}$ of an inch. A thickness of the plate may be $1/_{4}$ of an inch. A thickness of the plate may be $5/_{16}$ of an inch. A thickness of the plate may be $3/_{8}$ of an inch. A plate with a larger thickness may be used. Equivalent thicknesses of the plate may be provided based on a metric system of measurements.

The spring may comprise a plurality of pads, as described above, and a plurality of plates, as described above, disposed in a series with each other where the pad and the plate alternate with each other. This spring may be terminated with a pad on one or both ends. This spring may be terminated with a plate on one end. This spring may be terminated with a plate on both ends. The plate on one or both ends may be the same plate as the remaining plates in the spring. The plate on one or both ends may be a different plate than the remaining plates in the spring.

The spring may be held together with the elongated member passed through center apertures and in a similar manner as the above described housings.

The spring may comprise a plurality of disks disposed in a series with each other.

The disk may be manufactured from metal. In other words, the disk may comprise metal. Metal may be steel. Metal may be aluminum. Metal may be titanium. Metal may be a combination of any of metal, aluminum, and titanium. The disk may be manufactured from a polymer material. In other words, the disk may comprise a polymer. Polymer may be a carbon fiber. The disk may comprise a combination of metal and polymer. The disk is provided as a rigid disk.

The disk may be configured as a Belleville washer comprising a thin strip of hardened spring steel coiled into a circular shaped body with a frusta-conical configuration having an inner diameter and an outer diameter.

The disk may be configured as a wave washer.

The spring may comprise a plurality of disks configured as a column of inner rings and outer rings whose conical contact surfaces cooperate with each other with interposition of a lubricant, such as a grease.

This spring may be referred to as a pack spring. This spring may be referred to as a stack spring. The spring may be referred to as an assembly of disks.

The spring may comprise a coiled spring where a material is wound in a helical configuration. The spring may comprise be provided as two coiled springs, where one coil spring is sized to fit within the another coiled spring.

The spring may comprise a combination of different spring types. The spring may comprise a stack of elastomeric pads within the coiled spring. The spring may comprise a stack of elastomeric pads and plates within the coiled spring.

The spring may be configured to compress sufficient for a contact between the wall and the extremity.

A device may comprise a housing, as described above, and a spring, as described above. The spring is disposed within the hollow interior in a direct contact with each of the first and second extremities. The hollow interior may be sized to limit lateral travel of the plates in a direction normal to the length of the device. The spring is designed to compress when the first and second extremities move, in a linear manner, toward each other due to a force applied to one of the first and second extremities. The spring is further designed to return to the original state when the force is removed and the first and second extremities move away from each other. The first and second extremities may be in a first position when the force is not applied and move into the second position when the force is applied.

The spring may be mounted in an unstressed condition when the first and second extremities are in a first position. In the unstressed condition, the pads will maintain their initial height. The spring may be mounted in a partially stressed condition when the first and second extremities are in a first position. Such partially stressed condition may be referred to as a pre-compression. In this condition, the initial height of the pads will be reduced. The elongated component and the nut, as described above, may be used to vary amount of pre-compression by a rotation of the nut to reduce the distance between the extremities in the first position. The spring is further designed for a repetitive movement of the first and second extremities toward and away from each other, thus defining a reciprocal linear movement.

When the housing comprises a single wall, the spring extends past the open end of the wall when the first and second extremities are disposed in the first position. In this design, the second position may define a condition where the distal edge of the wall directly contacts the extremity. In this design, the second position may define a condition where the distal edge of the wall moved toward the extremity but did not contact the extremity. This condition may be referred to as an intermediate position of the first and second extremities.

When the housing comprises two walls, the spring extends past the open end of one wall when the first and second extremities are disposed in the first position but may be hidden from direct view by the other wall. In this design, the second position may define a condition where the distal edge of one wall directly contacts the opposite extremity. In this design, the second position may define a condition where the distal edge of one wall moved toward the opposite extremity but did not contact the opposite extremity. This condition may be referred to as an intermediate position of the first and second extremities.

The housing in a device where the spring is hidden from the direct view may protect the spring from environmental factors, for example such as moisture and dust.

The housing, as described above, is configured to limit compression of the spring by a contact of the wall with the extremity. The compression of the spring may be limited so as to prevent an over-stressed condition of the spring that may prevent the spring from returning to the original position and may result in a higher than desirable slack at the coupler. In other words, the housing, as described above, is designed to prevent over-compression of the spring by a contact of a wall with an extremity or by a contact of two walls with two extremities. The housing, as described above, provides a means for preventing over-compression of the spring.

The contact may occur when the pad between two adjacent plates is compressed 20-80%, of the uncompressed (initial) thickness of the pads. The contact may occur when the pad between two adjacent plates is compressed 20-60%, of the uncompressed (initial) thickness of the pads.

The pads may compress about ½ inches (from their uncompressed thickness prior to installation) before the contact prevents further compression.

The uncompressed thickness of a pad may be about 1¹¹⁄₁₆ inches and the outer diameter may be about 8¹³⁄₁₆ inches. Compressed for installation with a force of about 32 klb, the installed thickness of the pads may reduce to 1¼ inches. Under full compression, with the contact between the wall and the extremity, the pad thickness may be about ⅞ of an inch and the outside diameter may reach 10⅝ inches.

The device, as described above, may be designed to absorb energy acting on the device along a length thereof. Such energy may be referred to as an impact energy.

When the spring is adapted with elastomeric pads and rigid plates, as described above, each pad reduces in thickness and radially expands when the first and second extremities move toward each other. When the rigid plate is provided with through apertures, the elastomeric material flows into these through apertures, and thus the rigid plate with through apertures reduces speed (or rate) of the radial expansion of the pad during movement of the first and second extremities move toward each other. Thus, the through apertures may provide means for controlling radial expansion of the pad. As a result, the energy absorption of the device may increase while the movement distance between the first and second extremities may reduce. The rigid plate with through apertures may reduce costs of controlling radial expansion of the pad.

The device may be designed with a sensor configured to sense a presence or an absence of the contact between the wall and the extremity.

The sensor may be mounted in an aperture through a thickness of the extremity, the sensor configured to sense a contact between the edge of the wall and the extremity. The sensor may be provided as a pushbutton-type switch that has a movable switch button extending past a surface of the extremity and is actuated when the edge of the wall contacts the end of the switch button. The sensor may be provided as a magnetic-type or a proximity-type sensor that senses presence of the metallic wall edge. A sensor target may be mounted on the wall. The switch may be actuated upon a direct contact between the edge of the wall and the extremity. The switch may be actuated when the edge of the wall is adjacent the extremity but did not yet contact the extremity.

When the housing provided with two walls, the sensor may be mounted in an aperture through a thickness of one wall adjacent the extremity, the sensor configured to sense a presence or an absence of the wall portion adjacent the open end. It is sufficient that the sensor is positioned to sense presence or absence of the wall edge adjacent the extremity and not necessarily being in a direct contact therewith.

When the device is adapted with a sensor, a local control unit may be added to control operation of the sensor.

The local control unit may comprise a control circuit with a sensor input, the sensor being connected to the sensor input, a communication interface coupled to the control circuit and a battery, the sensor, the control circuit and the communication interface (circuit) being coupled to the battery. The control circuit may be configured to count a number of contacts between the wall and extremity and store the number in a memory. The local control unit may be design to communicate, through the communication interface the number of occurrences external to the device and enable remote access to and interrogation of the control circuit. Communication interface may include any one of a transmitter, a receiver and a transceiver, that communicates using any of the 802 standards of the Institute of Electrical and Electronics Engineers (IEEE), such as, but not limited to, 802.11 (WiFi), 802.15.1 (Bluetooth), and/or 802.15.4 (ZigBee). Communication interface may include an antenna. Antenna may be a component of the local control unit. Communication interface may be designed with an input port and circuitry to connect to a portable test unit. The connection may be via a cable. When the control circuit is provide with a microprocessor, the test unit may be designed to program or reprogram the microprocessor.

The control unit may be also provided with a communication port configured to enable control interface to the control unit.

The control unit may comprise a control circuit with a sensor input, the sensor being connected to the sensor input, a counter coupled to the control circuit and an electrical energy storage device, the sensor, the control circuit and the counter being coupled to the battery. The electrical energy storage device may be a battery. The counter may be designed to count a number of occurrences of the contact between the wall and the extremity.

The control unit may comprise an optional global positioning system (GPS) chip or circuit. The GPS chip may be used in a combination with the sensor to determine geographical coordinates of a position of the railcar when the contact between the wall and extremity occurred. The GPS chip may be used in a combination with the sensor to determine a position when the overload condition occurred. The local control unit may be referred to as a microcontroller.

The device, as described above, may be used in a variety of applications.

The device may be used as a cushion unit or as a cushioning device for a railcar. In this application the device may further comprise a railcar yoke.

The railcar yoke may comprise two walls defining an open front end shaped and sized to receive a coupler shank therethrough, an aperture through two walls in the open end, a rear wall opposite the open end along a length of the yoke, and two straps connecting the two walls with the rear wall and defining a cavity of the yoke, the cavity being in an open communication with the open front end.

The railcar yoke may comprise four walls defining an open front end, the open front end shaped and sized to receive a coupler shank therethrough, an elongated closed slot through two walls from the four walls, a rear wall opposite the open end along a length of the yoke, and two straps connecting remaining two walls from the four walls with the rear wall and defining a cavity of the yoke, the cavity being in an open communication with the open front end.

In either railcar yoke design, the device may further comprise a coupler follow disposed within the cavity of the yoke, adjacent the open end.

In either railcar yoke design, the housing with the spring may be disposed behind the yoke with the first extremity being disposed in a direct contact with the rear wall of the railcar yoke. The housing and spring may be referred to as a buff pack in this configuration.

In either railcar yoke design, the housing with the spring may be disposed within the cavity of the yoke between the coupler follower and the rear wall with the second extremity being disposed in a direct contact with the rear wall of the railcar yoke. The housing and spring may be referred to as a draft pack in this configuration.

The device may also comprise an optional C-shaped follower block connected to the rear wall of the yoke and disposed before the housing with the spring. The follower block is operable to transmit the force to the housing with the spring.

Two different housing and springs design may be provided to function both as buff and draft packs.

The housing and the spring, as described above, may be only provided as a buff pack with a friction-type draft gear disposed within the cavity of the yoke.

The housing and the spring, as described above, may be only provided as a draft pack with a friction-type draft gear or a hydraulic type gear disposed behind the rear wall of the yoke.

It would be understood that the railcar yoke is installed within an elongated hollow center sill of the railcar. The sill is adapted with a plurality of stops on opposite vertical surfaces of the sill, where two stops on opposite vertical surfaces are aligned with each other along a length of the sill.

These stops may be provided, in tandem, as draft or front stops, as buff or rear stops and optional intermediate stops. The distance between the front and rear stops may be about 38 inches to about 50 inches. The stops may be referred to as lugs.

When the housing and the spring are disposed behind the yoke, the second extremity may be positioned in a direct contact with the rear stops.

When the housing and the spring are disposed behind the yoke, the second extremity may be sized to fit between the rear stops and extend further into the sill while the abutment on the exterior surface of the middle housing configured to directly contact the rear stops.

When optional intermediate stops are used, the second housing and the spring within the second housing are sized to fit between the intermediate stops with the abutment on the third housing is sized and shaped to directly abut the rear stops.

The yoke and the housing with the spring may be provided individually and installed within the sill. The spring may be pre-compressed (pre-shortened) further using the elongated component and the threaded rod to fit between the yoke and the rear stops without interference. The compression is then released after the installation so that the extremity or abutment contacts rear stops.

The spring stack may be provided in a pre-shortened installation configuration, which allows draft portion and/or the buff portion to slide into the pocket and allows the coupler to be installed without interference. A plurality of shear pins, for example four shear pins pass through the yoke into the coupler follower. These shear pins break on first impact, and in this fully-installed or post-installation position, the coupler is pre-stressed, applying buff force against the draft and/or buff springs.

The housing and the spring may be rigidly connected to the yoke where the elongated component is also passed through an aperture through the rear wall of the yoke.

The device may be designed where the wall is provided as a hollow abutment on an exterior surface of the rear wall and is integrated with the yoke as a one-piece component. The wall may be integrated with the yoke by a casting process. The wall may be integrated with the yoke by a welding process. In this configuration only one extremity is needed to be disposed at the end of the spring. The one-piece component may reduce manufacturing costs of the device by eliminating operations needed to produce the wall independently from the yoke.

The housing and the spring may be designed to mount entirely within an inside area of the yoke and function as a buff pack to absorb energy in a buff condition. In this design, one extremity may contact an inside surface of a tail wall of the yoke and the other extremity may contact a C-shaped block or a C-block designed to receive the treaded nut. Or, center apertures in the draft pack may be sized to receive the nut and the threaded end portion of the rod.

In this design, one extremity may contact an inside surface of a tail wall of the yoke and the other extremity may contact a draft pack. The wall may be designed with a circular cross-section and the extremities may be designed with projections having aligned through holes to receive threaded rods external to the exterior surface of the wall.

The device, as described above, may further comprises a railway coupler with a coupler shank received within the open end of the yoke in a contact with the coupler follower.

The cushioning device, as described above, isolates one railcar from axial forces applied by adjacent railcar(s). The force applied in a direction to pull railcars from each other, through the couplers, is referred to as a draft force. Here, the first and second extremities will move away from each other. The force applied in a direction to push railcars toward each other, through the couplers, is referred to as a buff force. Here, the first and second extremities will move toward each other.

The device, as described above may be designed to accommodate buff and draft travel of at least 3¼ inches. The quantity of pads in the stack may depend on the travel requirement, standard pocket size, energy absorption requirement and any other factors of railcar operation.

The stack may range between about five inches (5") and about eighty inches (80") in an installed state, which may provide for travel (independently of any other component of the cushioning unit) in a range of 5/16 inches to 11½ inches, depending on the dimensions and materials of the plates and elastomeric pads. In an example only, and not by way of limitation, a stack having a length of 18⅞ inches may be designed to supply 3¾ inches of travel, and a stack of 28⅞ inches may be designed to supply 6⅛ inches of travel.

The device, as described above, may be designed to have a travel of 6 inches to 15 inches, although it would be apparent to a person of ordinary skill in the art that an additional elastomeric pad and associated plate could be added to a stack, and that would increase the travel and create softer cushioning, but at the expense of more space being required in the pocket.

A device, as described above, is designed to fit into an Association of American Railroads (AAR) standard pocket. The dimensions of a standard pocket and permitted tolerances may be set by the AAR from time to time, and reference herein to AAR standards refers to standards in the AAR Manual of Standards and Recommended Practices in effect at the filing date of this application, including performance standards, such as M-921-B, for hydraulic cushioning units. A person having ordinary skill in the art has a general knowledge of AAR standards and the published AAR standards cited herein are incorporated by reference as background.

The standard pocket may be characterized by a pocket length of 38¾ inches between the front and rear stops, as described in AAR standard S-183 for an "EOC-9" pocket. The standard pocket may be characterized by a pocket length of 48¾ inches between the front and rear stops, as described in AAR standard S-184 for an "EOC-10" pocket.

The device, as described above, may be designed for use with a box-type railcar. The box-type railcar comprises an enclosure with an opening to a hollow interior. The box-type railcar may be designed with the pocket length of 38¾ inches. The box-type railcar may be designed with the pocket length of 48¾ inches.

The device, as described above, may be designed for use with a flat-type railcar. The flat-type railcar is used to transport containers or trailers. The flat-type railcar may be designed with the pocket length of 38¾ inches. The box-type railcar may be designed with the pocket length of 48¾ inches.

The device, as described above, may be designed for use with an autorack-type railcar. The autorack-type railcar is designed to ship automobiles, including cars, trucks, SUVs and vans by rail. Autorack-type railcar is made of metal and are entirely enclosed to protect vehicles from the elements. Metal "racks" inside create levels (also referred to as "decks") within the railcar. The autorack-type railcar may be designed with the pocket length of 38¾ inches. The autorack-type railcar may be designed with the pocket length of 48¾ inches. The autorack-type railcar may require the device, as described above, to absorb an impact energy at the coupler so as to limit deceleration of the autorack-type railcar to 1G at 4 miles per hour (MPH), during impact, so as to protect the vehicles from damages.

Thus, the device, as described above, may be designed to replace a long stroke hydraulic cushioning unit which is commonly installed in the autorack-type railcar. The buff pack in the device may be designed with 21 pads and the draft pack may be designed with 10 pads.

The device, as described above, may be designed to absorb an impact energy at the coupler so as to limit deceleration of the railcar to 3G at 10 miles per hour (MPH).

The device, as described above, may comprise an optional accelerometer to measure an acceleration of the railcar. The accelerometer may be installed on the buff pack and coupled to the control unit adapted to receive input from the accelerometer and store and/or output the acceleration of the railcar. This output may be used to monitor conditions when the railcar is accelerated at a rate that exceeds a designed rate for the application.

The device, as described above, may comprise an optional velocity censor to measure speed of the railcar. The velocity sensor may be installed on the buff pack and coupled to the control unit adapted to receive input from the velocity sensor and store and/or output the speed of the railcar. This output may be used to monitor conditions when the speed of the railcar exceeds a designed speed for the application.

The device, as described above, may comprise an optional strain gage to measure impact force onto the device from the railcar. The strain gage may be installed on the buff pack and coupled to the control unit adapted to receive input from the strain gage and store and/or output the impact force. This output may be used to monitor conditions when the buff and/or draft force exceeds a designed impact force for the application.

The above described accelerometer, velocity sensor and strain gage, when provided, may be used to monitor and report conditions that may result in an over-compression of the spring. The data gathered from these devices may be used to determine that damages to the device occurred due to conditions that exceed designed capabilities of the device. The data gathered from these devices may be used to determine that damages to the device occurred due to operations errors that exceed designed operational parameters and, more particularly where longitudinal loads/forces on the railcars may frequently exceed design load limits set by AAR. The GPS chip may be used to determine a position of the railcar when the longitudinal loads/forces on the railcars may frequently exceed design load limits set by AAR.

Any one of the above described sensor, accelerometer, velocity sensor, strain gage, and GPS chip with the control unit may be installed on cushioning units already in use. In this retrofit installation, reliability and/or usable service life of the existing cushioning unit may be improvised by measuring operating forces and impacts and using the data to record and communicate conditions that exceed conditions specified by AAR standards.

In view of the above, a method may comprise installing a compressible and a resilient spring within hollow interiors of two housings configured for a reciprocal linear movement relative to one another, and compressing the compressible and resilient spring, to cushion a load applied to an extremity of one housing from the two housings. The method may further comprise contacting an extremity of one housing with an open end of another housing to prevent an overcompression of the compressible and resilient spring.

In view of the above, a method may comprise configuring a first rigid housing with a first hollow interior to be received within a second hollow interior of a second rigid housing for a reciprocal linear movement relative to one another, installing a compressible and a resilient spring within first and second hollow interiors, compressing the compressible and resilient spring, to cushion a load applied to an end of one rigid housing from the first and second rigid housings, and transferring the load through a direct contact between an extremity of one rigid housing with an open end of another rigid housing when the load exceeds designed cushioning capacity of the compressible and resilient spring.

In view of the above, a method may comprise cushioning, with a first device positioned within a railcar yoke, buff and draft forces from a railcar coupled to the yoke, and cushioning the buff forces, with a spring mounted behind a rear wall of the railcar yoke and within hollow interiors of two housings that are configured for a reciprocal telescoping movement relative to one another, the buff loads from the railcar In view of the above, a method may comprise installing within a railcar sill pocket a spring with elastomeric pads and rigid plates within hollow interiors of two housings configured for a reciprocal linear movement of at least 6¾ inches relative to one another, and absorbing, with the compressible and resilient spring, a repeated dynamic buff load of 950,000 pounds applied to an end of one housing from the two housings. The method may also comprise designing the spring with 21 elastomeric pads, each with an initial thickness of 1¹¹⁄₁₆ inches. The method may also comprise providing an aperture through a thickness and a center of each rigid plate and each elastomeric pad, passing a bolt through aligned apertures and threadably attaching a nut to a threaded end of the bolt. The reciprocal linear movement may be 9¾ inches.

In view of the above, a method may comprise installing within a railcar sill pocket two springs with elastomeric pads and rigid plates, each within hollow interiors of two housings. One of the housings may be designed to achieve a reciprocal linear movement of at least 6¾ inches, and absorbing, with the compressible and resilient springs, a repeated dynamic buff load of 950,000 pounds applied to an end of one housing from the two housings. The method may also comprise designing one of the springs with 21 elastomeric pads, each with an initial thickness of 1¹¹⁄₁₆ inches and designing another spring with 10 pads, each with an initial thickness of 1¹¹⁄₁₆ inches. The reciprocal linear movement may be 9¾ inches.

Any of the above described method may further comprise measuring a force or an impact onto the device, as described above, and may further comprise reporting a condition when the measured force or the measured impact exceeds a condition defined by AAR standards, as well as correlating such excess condition to a geographical location.

The device, as described above, may be used as a shock absorber. In this application, each extremity may be adapted with a mounting aperture. The shock absorber may be used on large mining vehicles. The shock absorber may be used on all-terrain vehicle (ATV).

The device, as described above, may be used as a damper.

The above described sizes of the pads and the movement distances of the housing(s) may be adjusted to fit the device for a specific application.

Now in a reference to the drawings.

In various figures, the device is essentially being illustrated with the first wall and the second wall being in a first position, where the spring is either uncompressed (unstressed) or pre-compressed (pre-stressed).

FIG. 1 illustrates a perspective view of a device 10 with the first extremity 20 and the second extremity 30. The second extremity 30 is illustrated as a plate or as a plate-shaped member with a first surface 32 and a second surface 34. A wall 40 is illustrated as being connected to the first extremity 20 at the end 48 with the opposite end 49 being disposed at a distance from the second extremity 30 but may be connected to the second extremity 30. The wall 40 has an interior surface 42 and an exterior surface 44. The wall 40 defines a hollow interior 46. The first extremity 20 and the wall 40 may be referred to as a housing or as a first housing.

Figure 2:
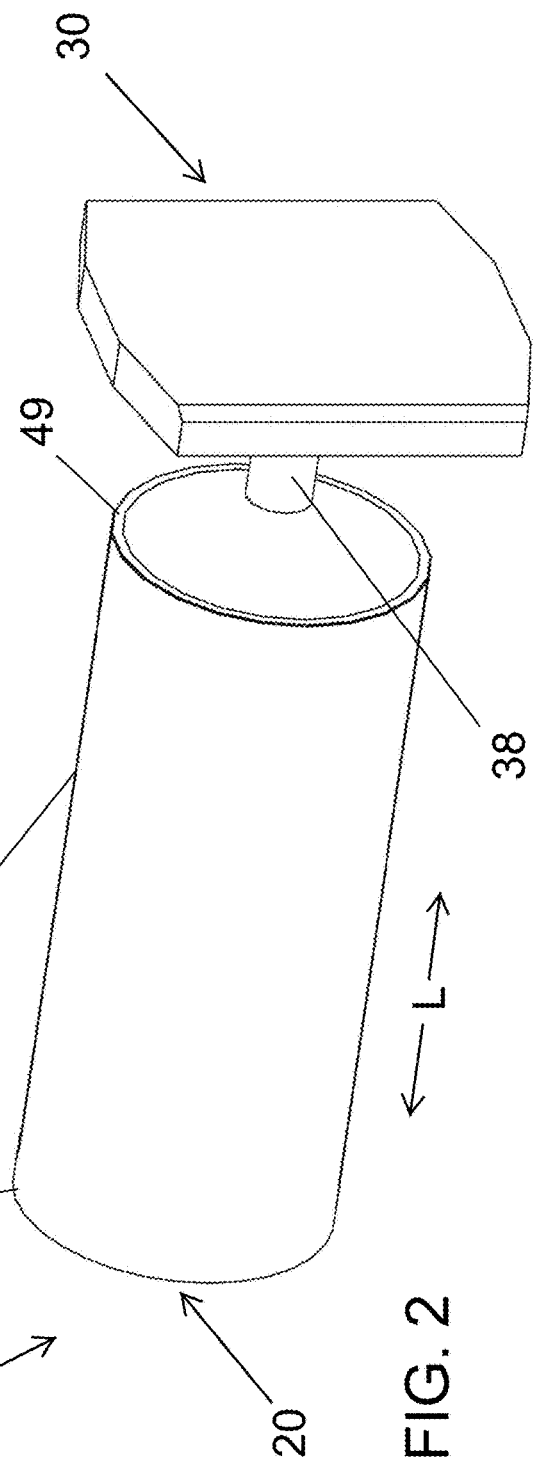
FIG. 2 illustrates perspective view of a device.

FIG. 2 illustrates perspective view of the device 10 with an extension 38 on a surface 34. The extension 38 may be fastened to the second extremity 30. The extension 38 may be welded to the second extremity 30. The extension 38 may be provided as a one-piece component with the second extremity 30. The one-piece component may be provided by a casting process. The one-piece component may be provided by a molding process. "L" illustrates direction of a length of the device 10.

FIG. 3 illustrates a perspective view of the device 10 with an elongated member 50 with a body 52 and a threaded end 54 extending past surface 32 of the second extremity 30. A threaded nut 58 is also illustrated.

FIG. 4 illustrates a perspective view of a device 10 with a second wall 60 connected to the second extremity 30. The second wall 60 is illustrated with an exterior surface 62 and a distal end 69. The second wall 60 is sized to receive the first wall 40 therewithin. The second extremity 30 and the wall 60 may be referred to as a housing or as a second housing.

FIG. 5 illustrates a perspective view of a spring 70 with a single pad 80 and a plate 90. The pad 80 is illustrated with a first surface 82 and a second surface 84 with a peripheral edge 86 and an optional center aperture 88. The plate 90 is illustrated with a first surface 92 and a second surface 94 with a peripheral edge 95. The plate 90 is illustrated with an optional center aperture 98. Optional apertures 96 through the thickness of the plate 90 are also illustrated. The plate 90 is illustrated as a rigid plate. The plate 90 is further illustrated as excluding projections, particularly at optional apertures 96.

FIG. 6 illustrates a perspective view of a spring 70 that includes a plurality of pads 80 and plates 90, as described above.

FIG. 7 illustrates a perspective view of a spring 70 that includes a plurality of pads 80 and plates 90, disposed in a series with each other, as a stack, as described above, with the rod 50 passing through the aligned center apertures 88 and 98.

FIG. 8 illustrates a perspective view of a spring 70 designed as a helical coil spring 72.

FIG. 9 illustrates a perspective view of a spring 76 with a single pad 80, as described above, and a plate 100. The plate 100 is illustrated with a first surface 102 and a second surface 104 and an optional center aperture 88. Projections 106 are illustrated as upstanding on each corner of the plate 90. An optional peripheral edge 108 defines a cavity 109 that may be sized to receive fifty (50) percent or less of a thickness of the pad 80.

FIG. 10 illustrates a perspective view of a spring 76 that includes of pads 80, as described above, and plates 90, as described above in FIG. 9 and that are disposed in a series with each other, as a stack. An optional end plate 78 Is also illustrated. The spring 76 is illustrated as being held together with the rod 50 and nut 58. Projections 106 on adjacent plates 90 may be used as stops to prevent over-compression of the pad 80. Projections 106 on adjacent plates 90 may be used as guides to maintain alignment of the spring 70. The peripheral edge 108 may be used as a stop during compression of the spring.

Figure 11:
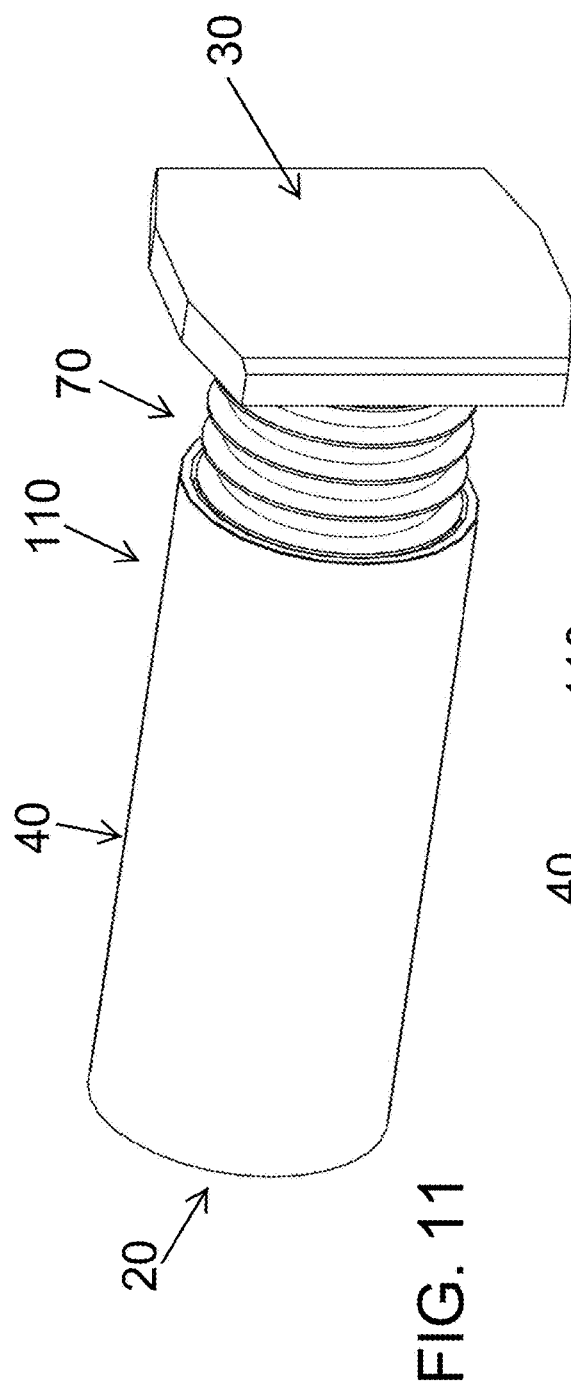
FIG. 11 illustrates a perspective view of a device with a spring.

FIG. 11 illustrates a perspective view of a device 10 which may be the device 10 of FIG. 1 or 2 with the spring 70, as described above.

Figure 12:
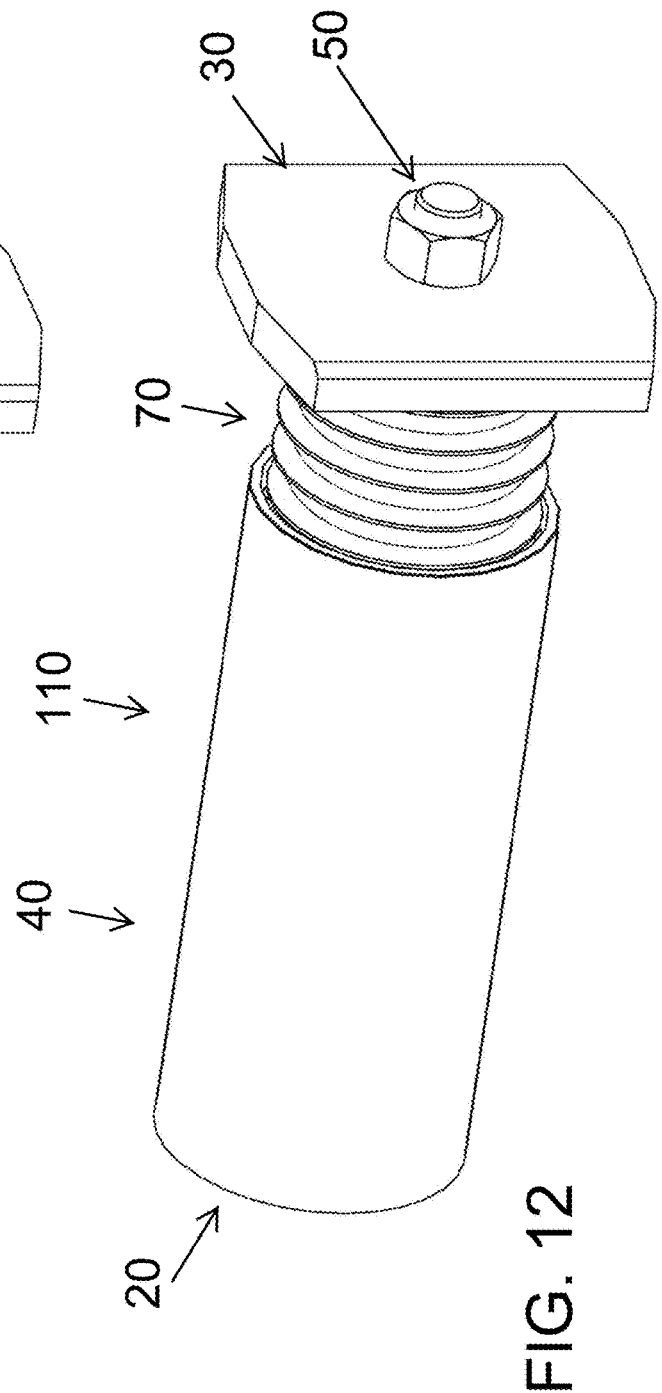
FIG. 12 illustrates a perspective view of a device with a spring.

FIG. 12 illustrates a perspective view of a device 10 which may be the device 10 of FIG. 3 with the spring 70, as described above.

Figure 13:
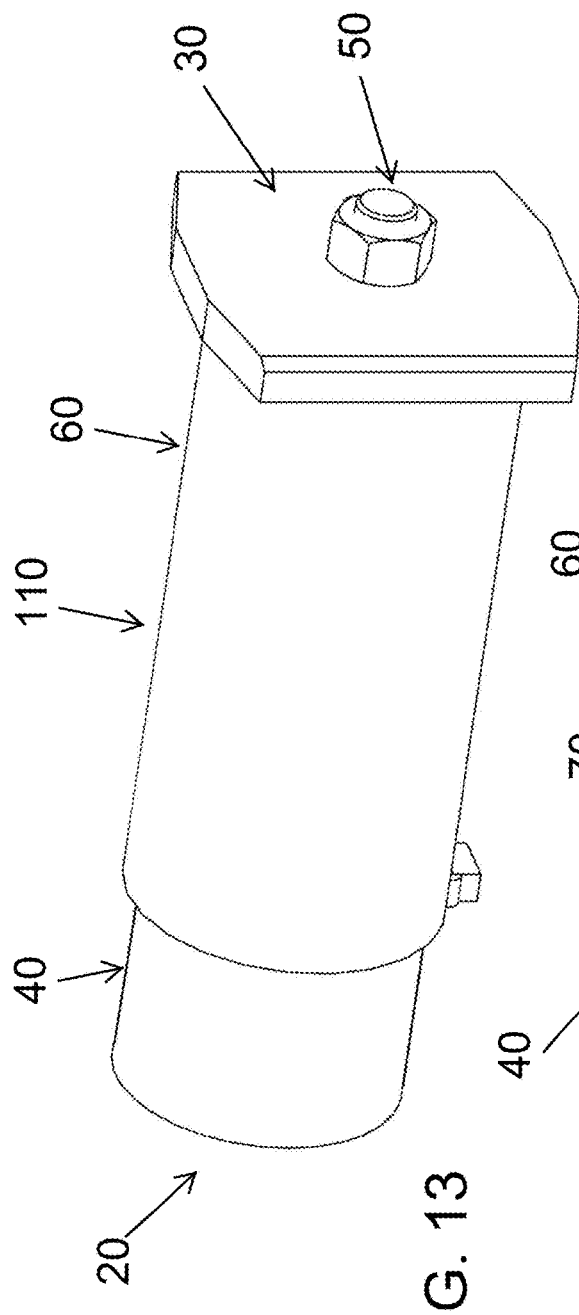
FIG. 13 illustrates a perspective view of a device with a spring.

FIG. 13 illustrates a perspective view of a 110 with the first extremity 20, as described above, the second extremity 30, as described above, the first wall 40, as described above, the second wall 60, as described above. The device 110 is illustrated with walls 40 and 60 having a circular cross-section to receive the spring 70, as described above, where the spring 70 is being hidden within the walls 40 and 60.

Figure 14:
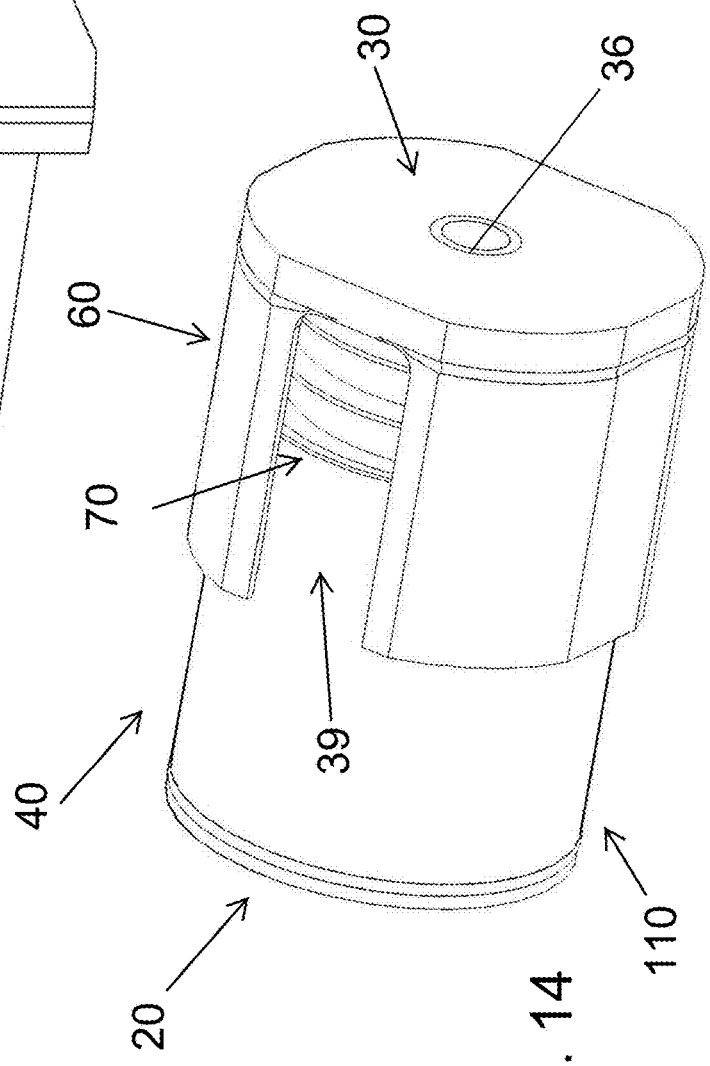
FIG. 14 illustrates a perspective view of a device with a spring.

FIG. 14 illustrates a perspective view of a device with the spring 70, as described above. The second extremity 30 is illustrated with the center aperture 36 that is sized to pass the rod 50 therethrough. The second wall 60 is illustrated with a void 39.

FIG. 15 illustrates a top view of the device 110 of FIG. 13.

FIG. 16 illustrates a cross-sectional view of the device 110 of FIG. 15 along lines 16-16. The first extremity is illustrated with the first surface 22, the second surface 24, and a tapered aperture 26 sized and shaped to receive tapered abutment 56 of the rod 50. Exterior surface 64 of the second wall 60 is also illustrated. FIG. 15 also illustrated a distance "T" between the end of the first wall 40 and the second extremity 30. Distance "T" denotes a linear movement distance between the first wall 40 and the second extremity 30. Sensor 412 is shown as being mounted within the thickness of the second wall 60. An enclosure 430 may be attached to the exterior surface 84 of the second wall 60 to house the control circuit 410, battery 414 and other electrical components, for example such as an optional communication interface 416. Reference numeral 67 denotes a support block.

Figure 17:
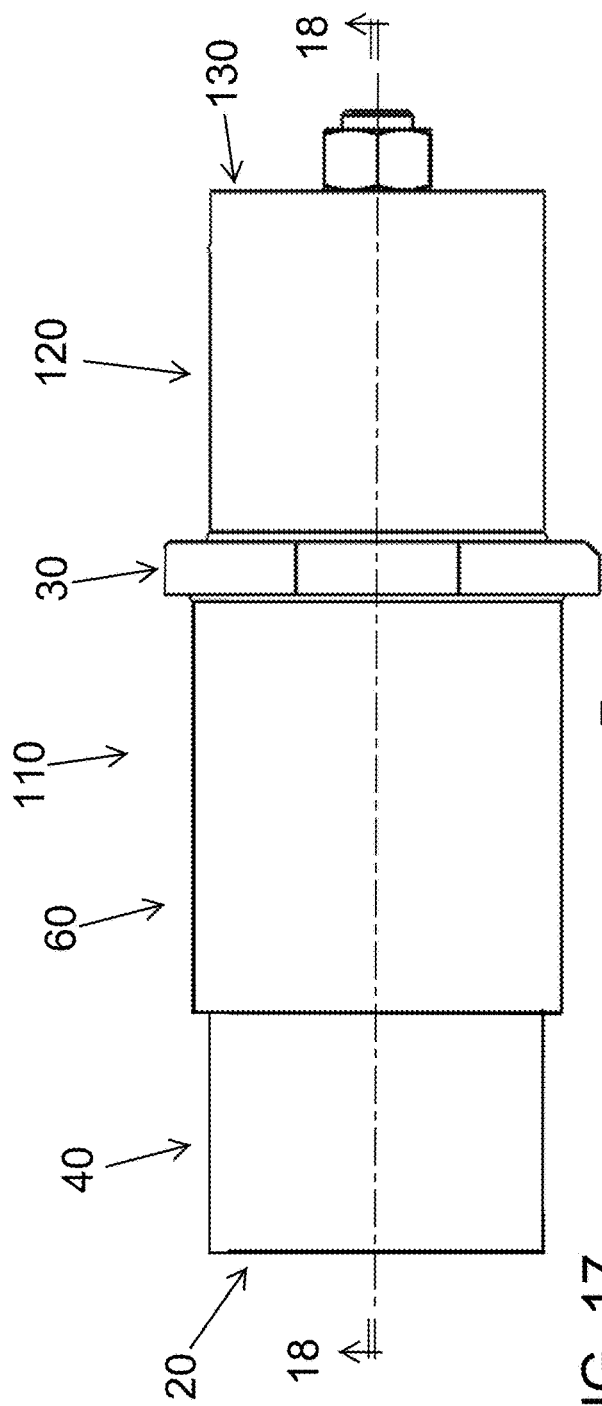
FIG. 17 illustrates a top view of the cushioning device with the spring.

FIG. 17 illustrates a top view of the device 110 which is adapted with a third wall 120 and extremity 130.

Figure 18:
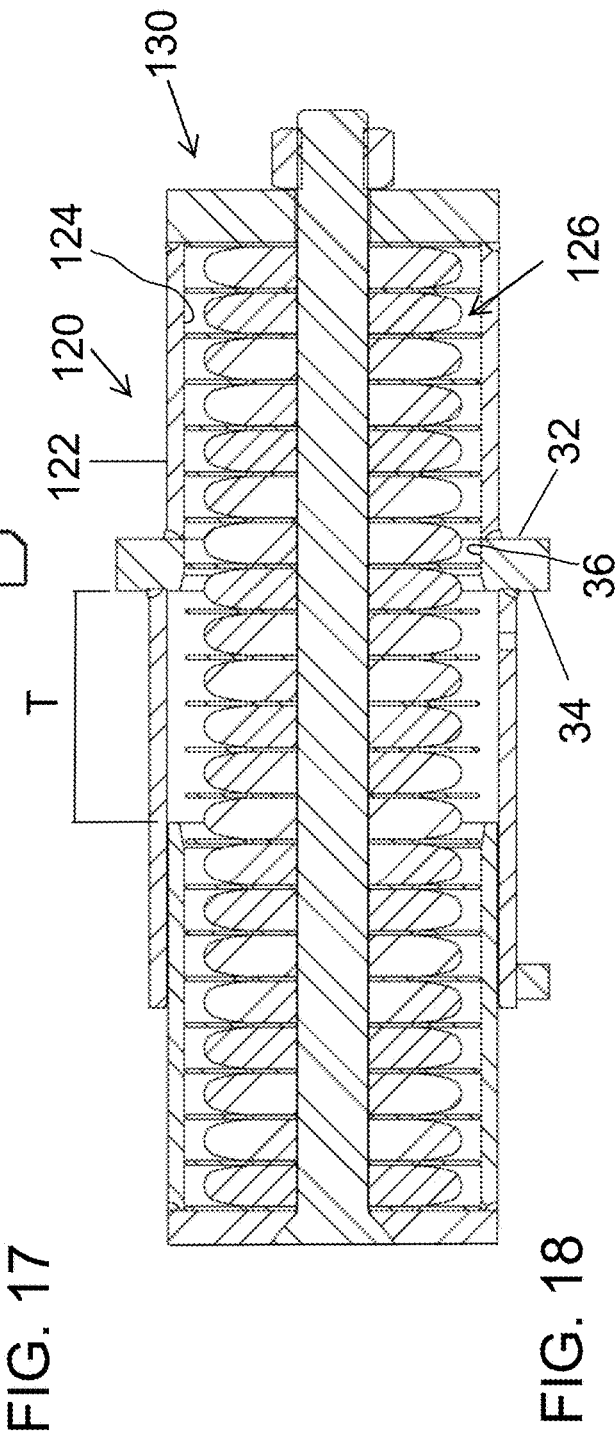
FIG. 18 illustrates a cross-sectional view of the cushioning device of FIG. 17 along lines 18-18.

FIG. 18 illustrates a cross-sectional view of the device of FIG. 17 along lines 18-18. The previously described second extremity 30 is illustrated as a flange with the center aperture 36 being enlarged to allow passage of the spring 70 therethrough and yet function as a stop to prevent over-compression of the spring 70 when the first wall 40 contacts the surface 34. The third wall 120 is illustrated with an exterior surface 122 and an interior surface 124 defining a hollow interior 126.

FIG. 19 illustrates a top view of a railcar cushioning device 150 that includes the device 110, at least of FIGS. 15-16 as described above, a yoke 160, another spring 76 disposed within the yoke 160 and a coupler follower 180.

The yoke 160 is illustrated as an F-type yoke with an aperture 174. The yoke may be provided as an E-type yoke.

FIG. 20 illustrates a cross-sectional view of the device of FIG. 19 along lines 20-20. The yoke has an open front end 162, a rear wall 164 with an exterior surface 168, two straps 170 defining a cavity 172. The spring 76 and the coupler follower 180 are disposed within the cavity 172.

Figure 21:
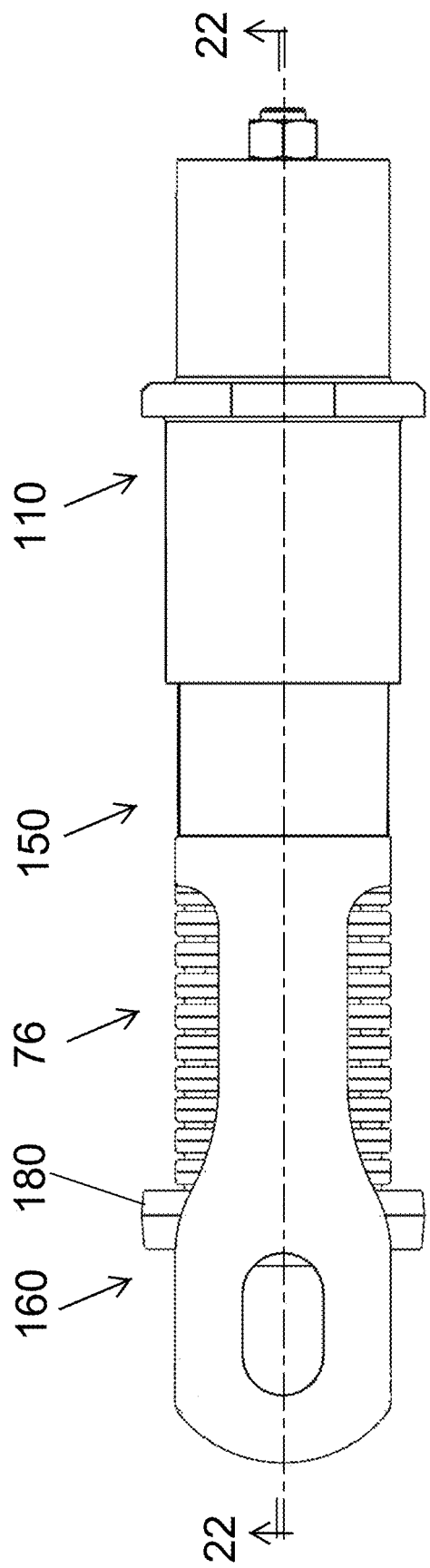
FIG. 21 illustrates a top view of a cushioning device with the spring.

FIG. 21 illustrates a top view of a railcar cushioning device 150 that includes the device 110, at least of FIGS. 17-18 as described above, the yoke 160, another spring 76 disposed within the yoke 160 and the coupler follower 180. The yoke 160 is illustrated as an F-type yoke with an aperture 174.

Figure 22:
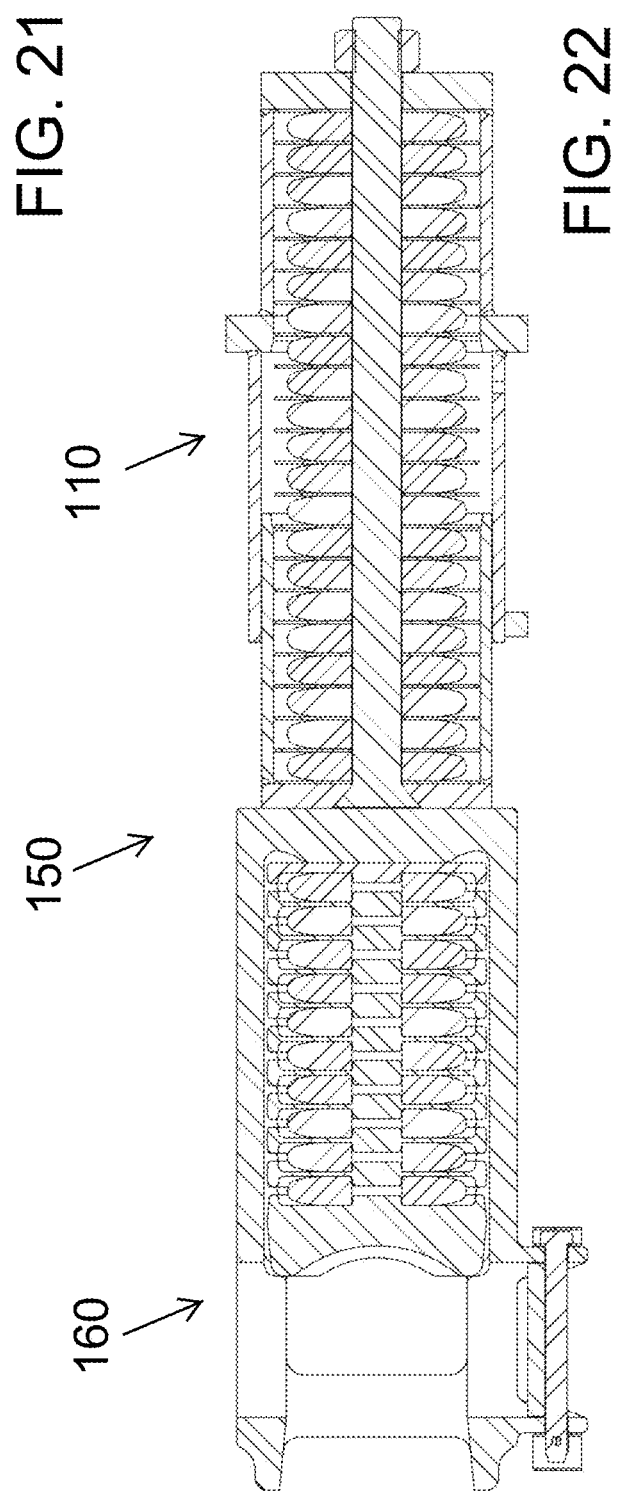
FIG. 22 illustrates a cross-sectional view of the device of FIG. 21 along lines 22-22.

FIG. 22 illustrates a cross-sectional view of the railcar cushioning device 150 of FIG. 21 along lines 22-22.

Figure 23:
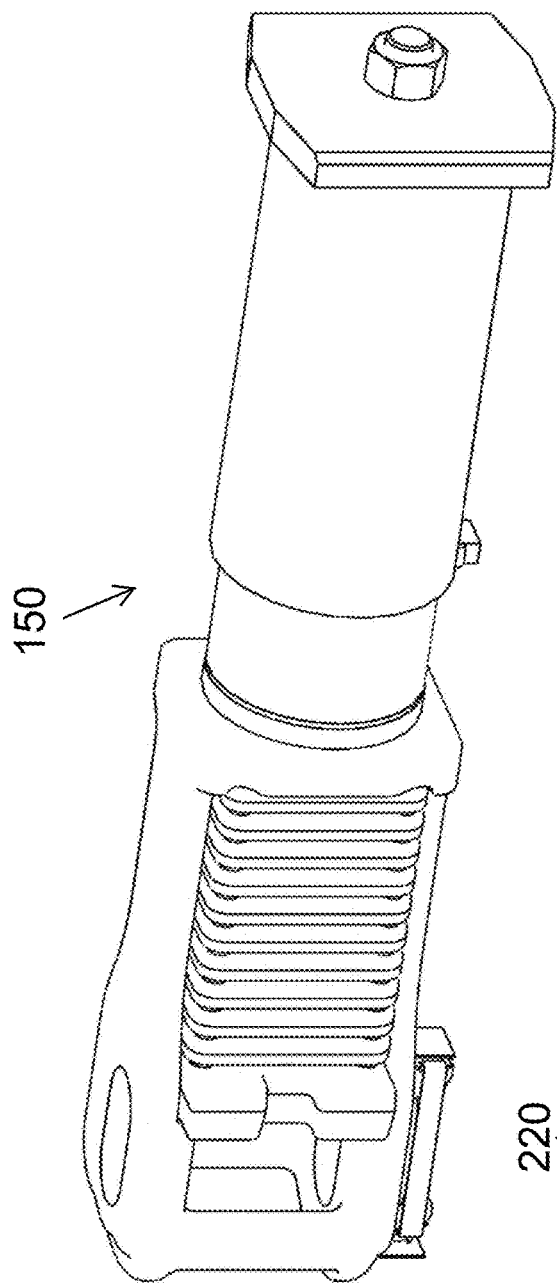
FIG. 23 illustrates a perspective view of a cushioning device of FIGS. 19-20.

FIG. 23 illustrates a perspective view of the railcar cushioning device 150 of FIGS. 19-20.

Figure 24:
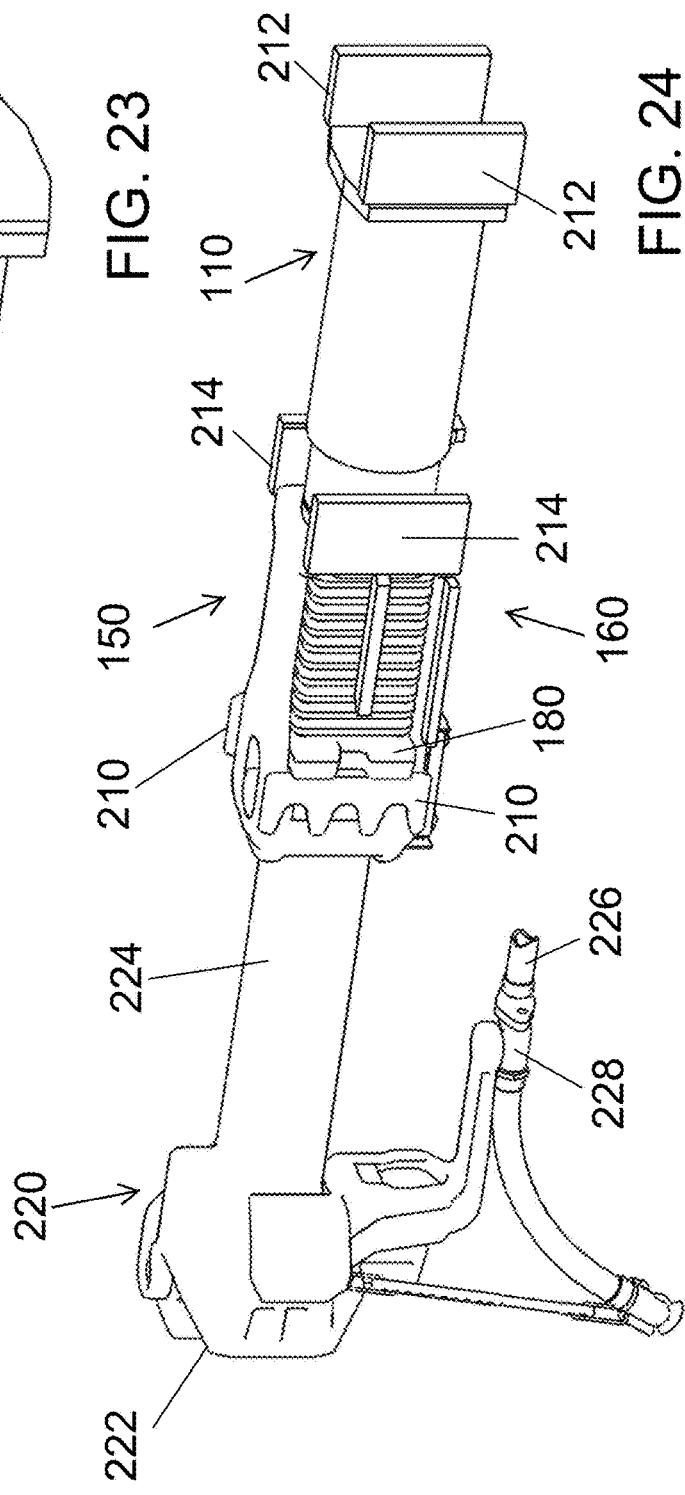
FIG. 24 illustrates a perspective view of the cushioning device of FIG. 23 adapted with a railcar coupler.

FIG. 24 illustrates a perspective view of the railcar cushioning device 150 of FIG. 23 adapted with a railcar coupler 220 that has a coupler knuckle 222 and a coupler shank 224. The coupler shank is illustrated as being received within the open front end 162. Also illustrated are front stops 210, rear stops 212 and optional intermediate stops 214. The device 110 is illustrated as being disposed between the rear wall 164 and rear stops 212. The device 110 of FIGS. 21-22 will extend, with the third wall 120, between the rear stops 212.

FIG. 25 illustrates a top view of a cushioning device that includes the yoke 160, as described above, the device 110, as described above, the railcar coupler 220, as described above and with a C-block 230. A friction-type draft gear 250 is also illustrated as being disposed within the cavity 172 of the yoke 160.

FIG. 26 illustrates a front view of the cushioning device of FIG. 25.

FIG. 27 illustrates a yoke 160 for a railcar with integrated first wall 40.

FIG. 28 illustrates a perspective view of a cushioning device with the yoke 160, illustrated as an E-type yoke with the slot 176. The device 110 of FIG. 14 is also illustrated. The yoke may be provided as an F-type yoke.

Figure 29:
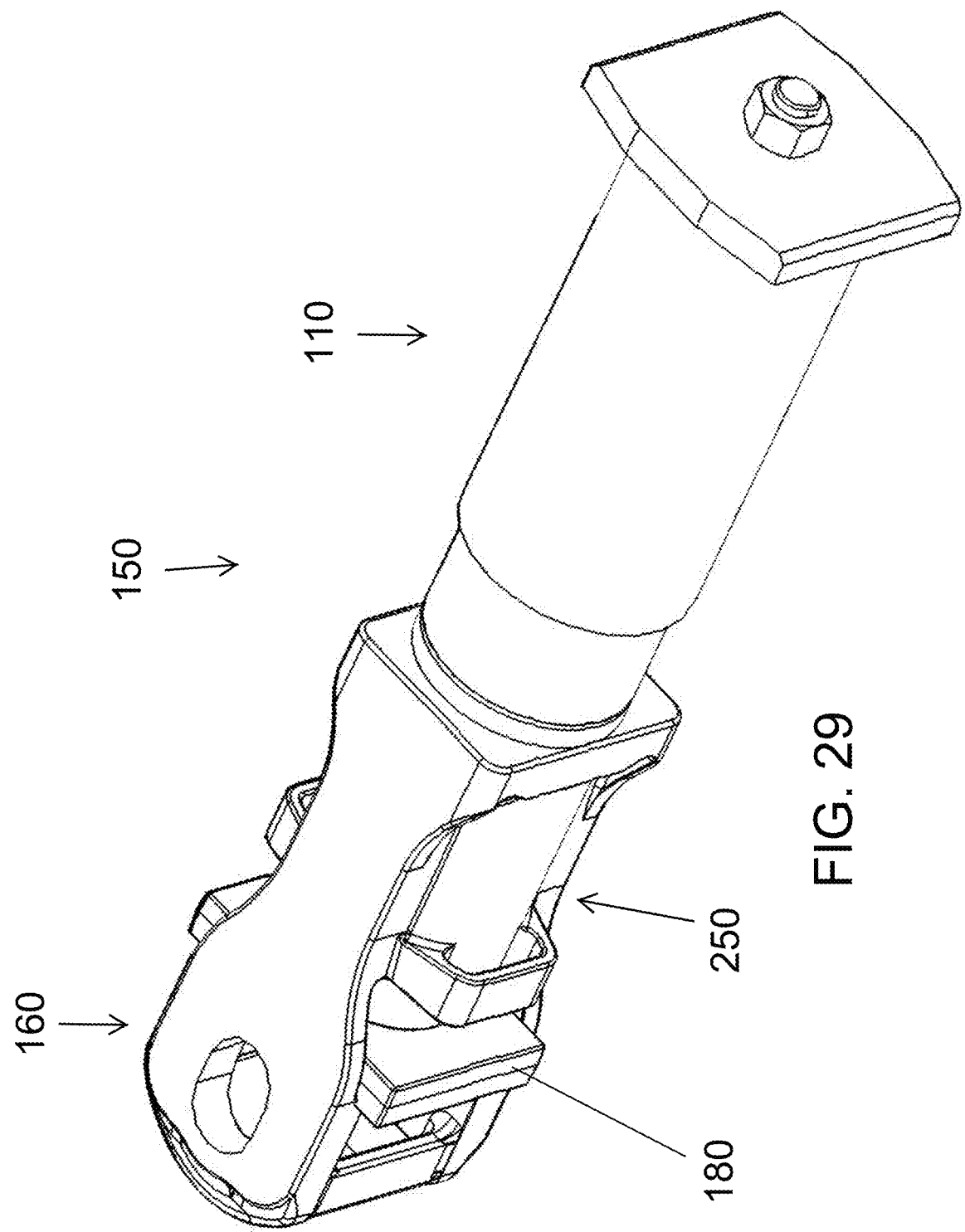
FIG. 29 illustrates a perspective view of a cushioning device.

FIG. 29 illustrates a perspective view of a railcar cushioning device 150 with the yoke 160, as described above and the device 110 of FIGS. 15-16. The spring 76 in FIG. 29 is being replaced with a friction-type draft gear 250.

Figure 30:
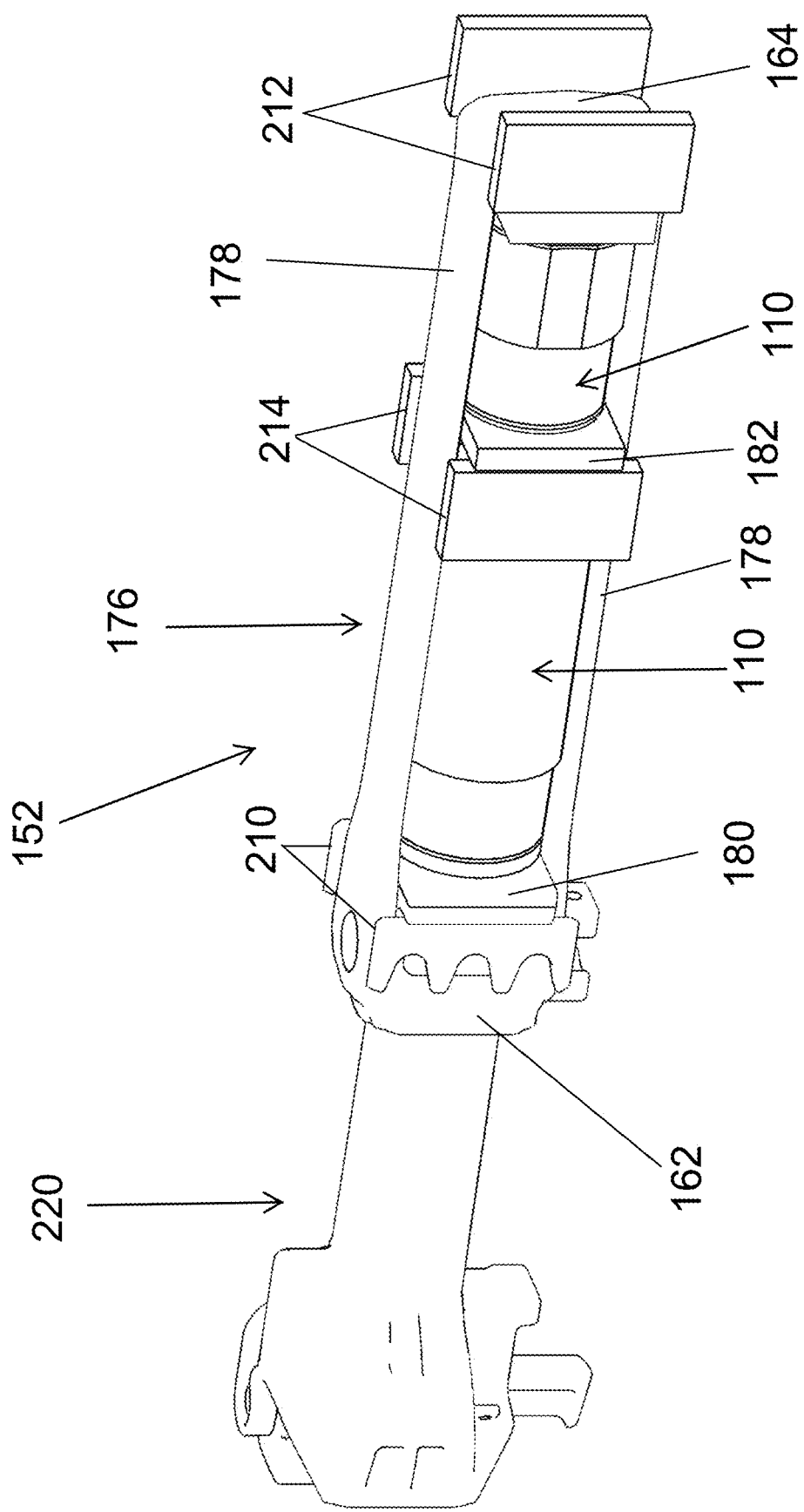
FIG. 30 illustrates a perspective view of a cushioning device.

FIG. 30 illustrates a perspective view of a cushioning device 152 with the yoke 160, as essentially described above (see for example FIG. 20), but with longer straps 178 connecting the open front end 162 with the rear wall 164. Two telescoping device 110 are positioned within the cavity of the yoke 160 between the coupler follower 180 and the rear wall 164. The devices 110 may be of the type shown in FIG. 13 (without a rod and a nut) as a draft pack and FIG. 14 as a buff pack. The position of the cushioning devices 110 of FIGS. 13-14 may be reversed with a different positioning of intermediate stops 214. The designs of the cushioning devices 110 may be identical to each other, except for amount of compression of the spring. An extremity of one device 110 is designed to contact the rear stops 212. An intermediate plate 182 is also provided in a contact with the intermediate stops 214. The intermediate plate 182 is positioned to limit draft travel in the range of 2 inches to 3½ inches and the buff travel would be the full stroke of both cushioning units 110, between 6½ inches to 10 inches or more, if pocket space allows.

Figure 31:
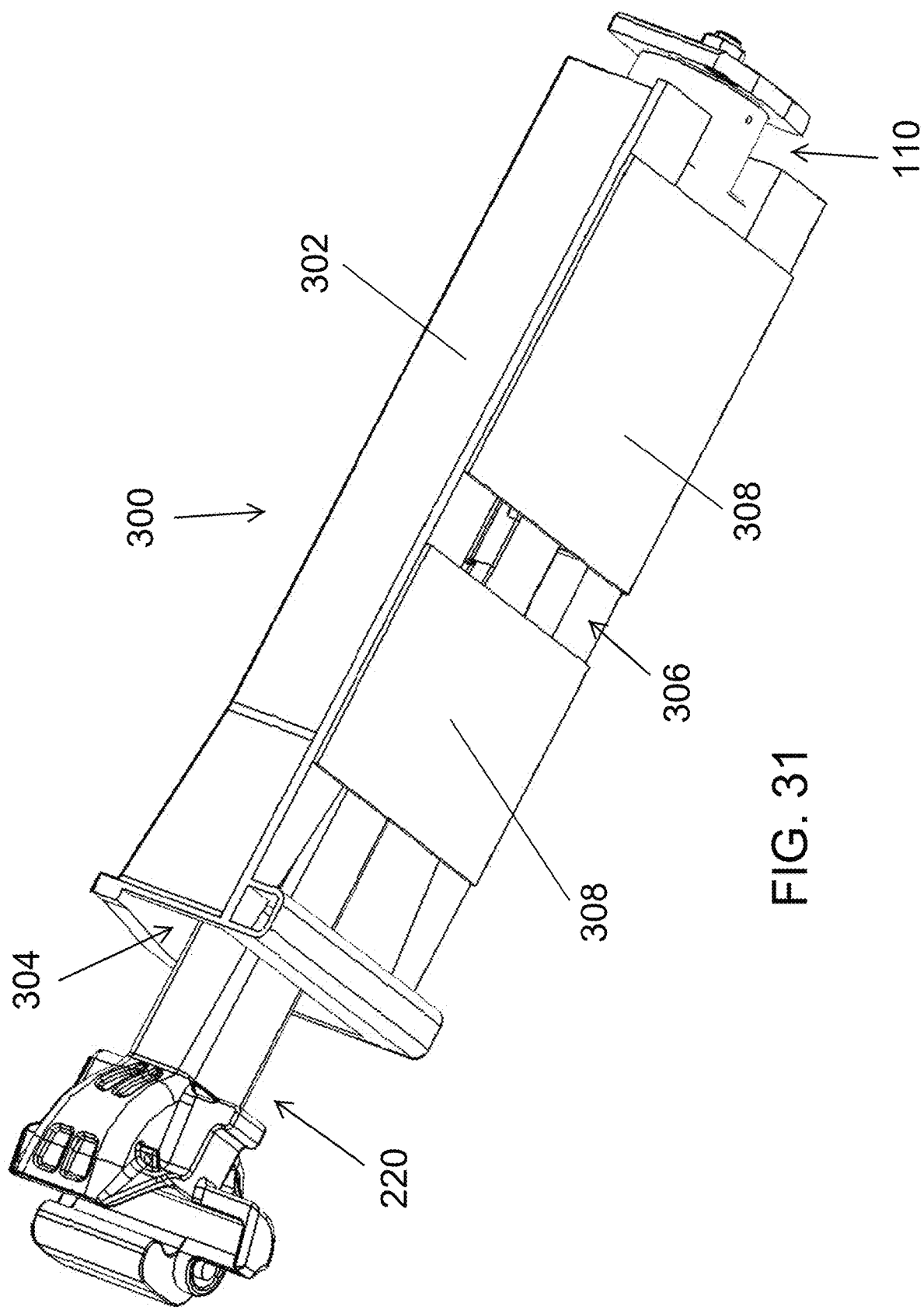
FIG. 31 illustrates a perspective view of a cushioning device installed within a center sill of a railcar.

FIG. 31 illustrates a perspective view of the device 110 installed within a cavity 306 of a center sill 300 of a railcar.

The center sill 300 is illustrated with a side wall 302 (the opposite side wall 302 is hidden from view), an opening 304 to receive the coupler shank 224 of the railcar coupler 220. Bottom plates 308 are also illustrated.

Figure 32:
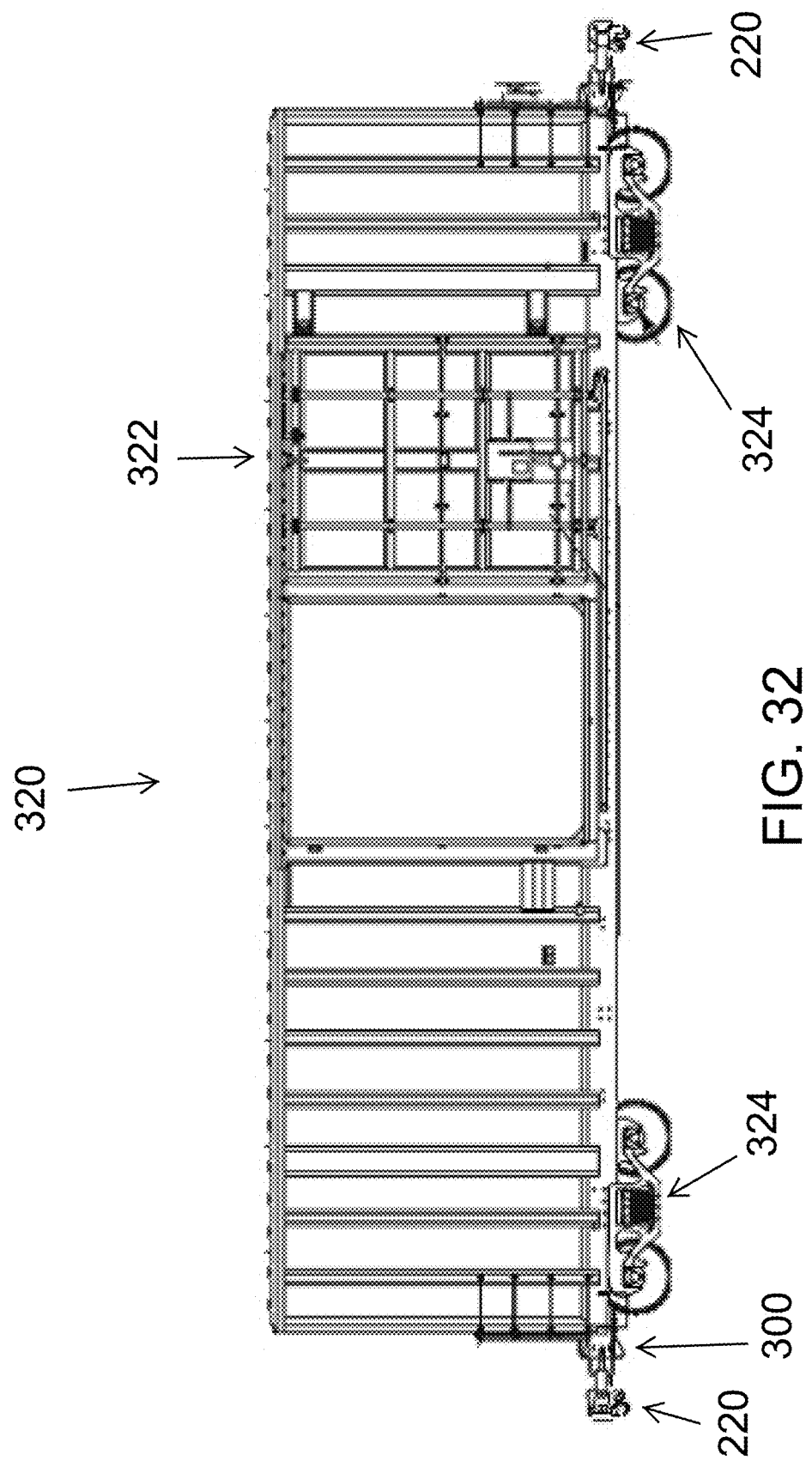
FIG. 32 illustrates a front view of a railcar with the cushioning device.

FIG. 32 illustrates a front view of a box-type railcar 320 with a shell 322 supported on a pair of bogies 324. Center sill 300 is also illustrated with the railcar coupler 220 protruding from each end. Other railcar type may be used. The art cushioning device is installed at each end of the box-type railcar 320.

Figure 33:
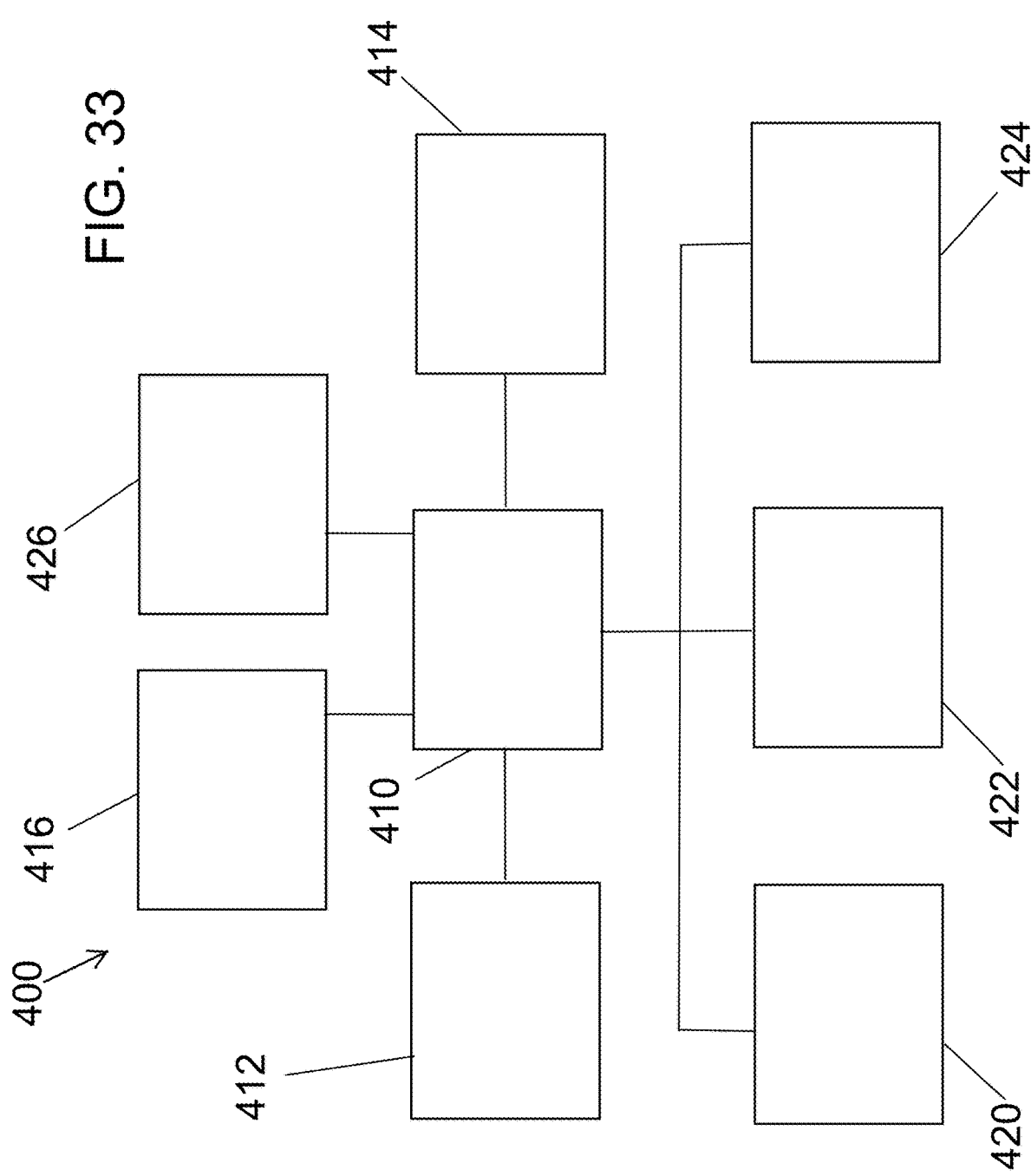
FIG. 33 illustrates a block diagram of a control unit.

FIG. 33 illustrates a block diagram of a control unit 400. The control unit includes a control circuit 410. The control circuit 410 may be a microprocessor with a non-transient memory (data storage). A sensor 412 and a battery 414 are coupled to the control circuit 410. An optional communication interface 416 is also coupled to the control circuit 410. Optional acceleration sensor 420, an optional speed sensor 422, an optional strain gage 424, and an optional global positioning system (GPS) chip 426 may be provided. The control circuit 410 may be a counter. The counter may be provided without the communication interface 416.

Figure 34:
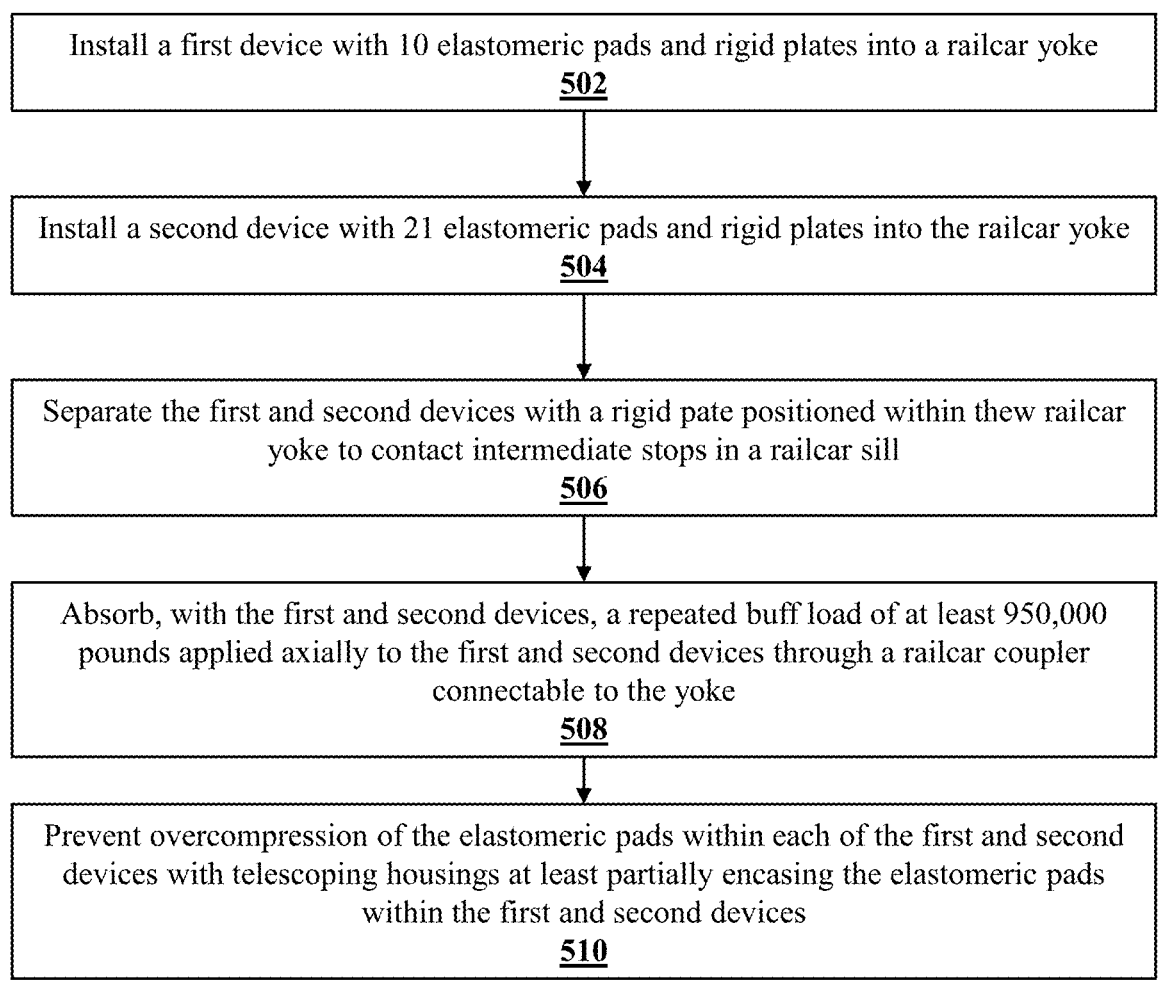
FIG. 34 illustrates a flowchart of an exemplary method.

FIG. 34 illustrates a flowchart of a method 500. As shown in FIG. 34, method 500 may include installing a first device with 10 elastomeric pads and rigid plates into a railcar yoke (block 502). As also shown in FIG. 34, method 500 may include installing a second device with 21 elastomeric pads and rigid plates into the railcar yoke (block 504). As further shown in FIG. 34, method 500 may include separating the first and second devices with a rigid plate positioned within the yoke to contact intermediate stops in a railcar sill (block 506). As also shown in FIG. 34, method 500 may include absorbing, with the first and second devices, a repeated buff load of at least 950,000 pounds applied axially to the first and second devices through a railcar coupler connectable to the yoke (block 508). As further shown in FIG. 34, method 500 may include preventing over-compression of the elastomeric pads within each of the first and second devices with telescoping housings at least partially encasing the elastomeric pads within the first and second devices (block 510). For example, device may prevent over-compression of the elastomeric pads within each of the first and second devices with telescoping housings at least partially encasing the elastomeric pads within the first and second devices, as described above.

Although FIG. 34 shows example blocks of method 500, in some implementations, method 500 may include additional blocks, fewer blocks, different blocks, or differently arranged blocks than those depicted in FIG. 34. Additionally, or alternatively, two or more of the blocks of the method 500 may be performed in parallel.

Figure 35:
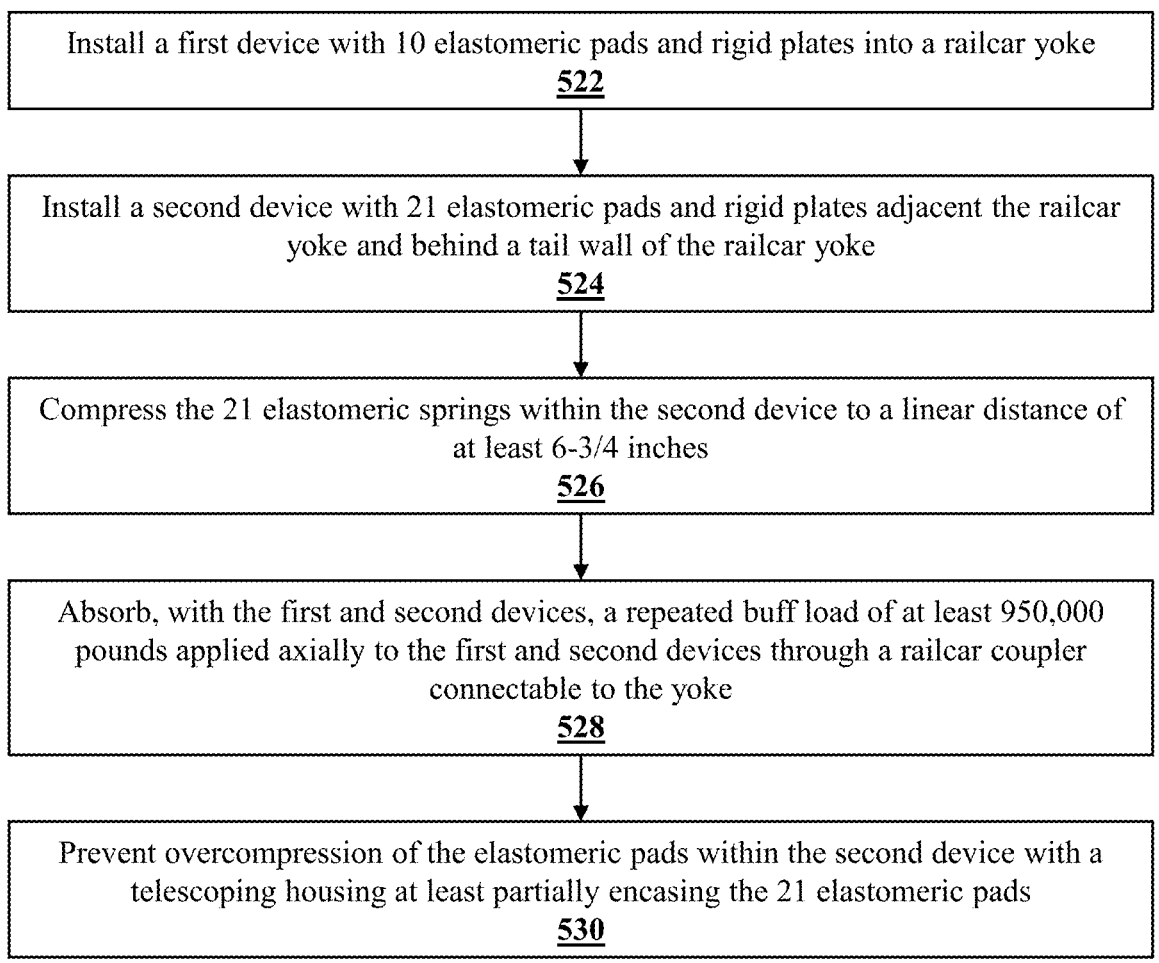
FIG. 35 illustrates a flowchart of an exemplary method.

FIG. 35 illustrates a flowchart of a method 500. As shown in FIG. 35, method 520 may include installing a first device with 10 elastomeric pads and rigid plates into a railcar yoke (block 522). As also shown in FIG. 35, method 520 may include installing a second device with 21 elastomeric pads and rigid plates adjacent the railcar yoke and behind the tail wall of the railcar yoke (block 524). As also shown in FIG. 35, method 520 may include compressing the 21 elastomeric springs within the second device to a linear distance of at least 6¾ inches (block 526). As also shown in FIG. 35, method 520 may include absorbing, with the first and second devices, a repeated buff load of at least 950,000 pounds applied axially to the first and second devices through a railcar coupler connectable to the yoke (block 528). As further shown in FIG. 35, method 520 may include preventing over-compression of the elastomeric pads within each of the first and second devices with telescoping housings at least partially encasing the elastomeric pads within the first and second devices (block 530). For example, device may prevent over-compression of the elastomeric pads within each of the first and second devices with telescoping housings at least partially encasing the elastomeric pads within the first and second devices, as described above.

Although FIG. 35 shows example blocks of method 520, in some implementations, method 520 may include additional blocks, fewer blocks, different blocks, or differently arranged blocks than those depicted in FIG. 35. Additionally, or alternatively, two or more of the blocks of the method 520 may be performed in parallel.

EMBODIMENTS

Embodiment A

A device comprises a housing and a spring. The housing comprises a first extremity, a second extremity opposite the first extremity along a length of the device defined by first and second extremities, and a wall, the wall having a first edge at the first extremity and a second edge disposed at a distance from the second extremity, the wall extending along the length and defining a hollow interior. The spring is disposed within the hollow interior in a direct contact with each of the first and second extremities.

A feature of this embodiment is that the wall comprises a circular cross-section in a plane normal to the length of the device.

A feature of this embodiment is that the spring comprises a pad and a plate. The pad comprises a first surface, a second surface, the second surface being spaced apart from the first surface to define a thickness of the pad, a peripheral edge surface, and an elastomeric material. The plate comprises a pair of surfaces spaced apart from each other to define a thickness of the plate, apertures through the thickness of the plate and a metallic material, the plate being void of any projections on each of the pair of surfaces.

A feature of this embodiment is that each surface of the plate comprises a smooth surface.

A feature of this embodiment is that the spring comprises a pad and a rigid plate. The pad includes a first surface, a second surface, the second surface being spaced apart from the first surface to define a thickness of the pad, a peripheral edge surface, and an elastomeric material.

The rigid plate includes projections on one or both of pair of surfaces of the rigid plate.

A feature of this embodiment is that the spring includes elastomeric units, each elastomeric unit comprises an elastomeric pad and a rigid plate disposed in a surface-to-surface contact with the elastomeric pad, and aligned axial apertures in each of the elastomeric pad and plate; and a rod passing through the aligned axial apertures.

A feature of this embodiment is that the rod comprises an abutment on one end and a thread on another end and wherein one of the first and second extremities comprises an aperture sized and shaped to receive the abutment therewithin and wherein the another one of the first and second extremities comprises an aperture sized and shaped to pass the rod therethrough so that the thread extends external to the another one of the first and second extremities.

A feature of this embodiment is that the housing comprises a first housing comprising a first wall, the first extremity, a first open end and a first hollow interior, a second housing comprising a second wall, the second extremity, a second open end and a second hollow interior, the second hollow interior sized to receive the first wall therewithin, and the first and the second housings configured for a reciprocal linear movement relative to each other between a first position where the first open end being disposed at the distance from the second extremity and a second position where the first open end being disposed in a direct contact with the second extremity, the spring extending past the first open end when the first housing is disposed in the first position.

A feature of this embodiment is that the first housing comprises a circular cross-section in a plane normal to the length of the device and wherein the second housing comprises a rectangular cross-section in the plane normal to the length of the device.

A feature of this embodiment is that the second housing comprises an abutment on an exterior surface mediate the second open end and the second extremity.

A feature of this embodiment is that the first wall is sized and shaped to fit within the second wall and wherein the spring is configured to compress sufficient for the first open end to contact a surface of the second extremity.

A feature of this embodiment is that the device further comprises a sensor mounted in an aperture through a thickness of the second wall adjacent the second extremity, the sensor configured to sense a presence or an absence of the first wall adjacent the first open end.

A feature of this embodiment is that the device further comprises a control unit coupled to the sensor. The control unit comprises a control circuit with a sensor input, the sensor being connected to the sensor input, a communication circuit coupled to the control circuit, and a battery, the sensor, the control circuit and the communication circuit being coupled to the battery.

A feature of this embodiment is that the device further comprises a sensor mounted in an aperture through a thickness of the second extremity, the sensor configured to sense the direct contact between the first open end and the second extremity.

A feature of this embodiment is that the device further comprises a counter coupled to the sensor, the counter configured to count a number of occurrences of the direct contact.

A feature of this embodiment is that the device further comprises a cavity in a thickness of the first wall, the cavity exposed from an exterior surface of the first wall, and a lubricating liner positioned within the cavity.

A feature of this embodiment is that the device further comprises a cavity in a thickness of the second wall, the cavity exposed from an interior surface of the second wall, and a lubricating insert positioned within the cavity.

A feature of this embodiment is that the device further comprises a cavity in a thickness of the first wall, the cavity exposed from an exterior surface of the first wall, and a wear insert positioned within the cavity.

A feature of this embodiment is that the device further comprises a cavity in a thickness of the second wall, the cavity exposed from an interior surface of the second wall, and a wear insert positioned within the cavity.

A feature of this embodiment is that the device further comprises a liner between an exterior surface of the first wall and an interior surface of the second wall, the liner comprising a polymer material.

A feature of this embodiment is that the spring comprises beveled washers disposed in a series with each other.

A feature of this embodiment is that the spring comprises a coiled spring.

A feature of this embodiment is that the spring comprises a friction spring comprising a column of inner and outer disks with tapered shapes.

A feature of this embodiment is that the spring comprises an elastomeric material.

A feature of this embodiment is that the housing comprises a first housing comprising a first wall, the first extremity, a first open end and a first hollow interior, a second housing comprising a second wall, a flange with an aperture sized to pass the spring therethrough, a second open end and a second hollow interior, the second hollow interior sized to receive the first wall therewithin, and a third housing comprising a third wall, a third open end, a second extremity, a third hollow interior, the first and the second housings configured for a reciprocal linear movement relative to each other between a first position where the first open end being disposed at a distance from the flange and a second position where the first open end being disposed in a direct contact with the flange; the spring extending past the first open end when the first housing is disposed in the first position.

A feature of this embodiment is that the first and the second extremities move between a first position where an end of the wall being closest to the second extremity being disposed at a distance from the second extremity and a second position where the end of the wall being disposed in a direct contact with the second extremity.

A feature of this embodiment is that the first and the second extremities comprises an elongated projection extending into the hollow interior and wherein the spring comprises an aperture sized and shaped to receive a peripheral surface of the elongated projection therethrough.

A feature of this embodiment is that the device further comprises a sensor positioned and operable to sense the wall adjacent the second edge thereof.

A feature of this embodiment is that the device further comprises a railcar yoke, the railcar yoke comprises two walls defining an open front end shaped and sized to receive a coupler shank therethrough, an aperture through two walls in the open end, a rear wall opposite the open end along a length of the yoke, two straps connecting the two walls with the rear wall and defining a cavity of the yoke, the cavity being in an open communication with the open front end, the first extremity being in a direct contact with the rear wall.

A feature of this embodiment is that the device further comprises a railcar yoke, the railcar yoke comprises four walls defining an open front end, the open front end shaped and sized to receive a coupler shank therethrough, an elongated closed slot through two walls from the four walls, a rear wall opposite the open end along a length of the yoke, and two straps connecting remaining two walls from the four walls with the rear wall and defining a cavity of the yoke, the cavity being in an open communication with the open front end, the first extremity being disposed in a direct contact with the rear wall.

Embodiment B

A device comprises a first housing comprising a first wall, a first extremity, a first open end and a first hollow interior, a second housing comprising a second wall, a second extremity, a second open end and a second hollow interior, the second hollow interior sized to receive the first wall therewithin, and a spring disposed within each of the first and second hollow interiors between the first extremity and the second extremity, the first and the second housings configured for a reciprocal linear movement relative to each other between a first position where the first open end being disposed at a distance from the second extremity and a second position where the first open end being disposed in a direct contact with the second extremity, the spring extending past the first open end when the first housing is disposed in the first position.

Embodiment C

A device comprises a first housing comprising a first wall, the first extremity, a first open end and a first hollow interior, a second housing comprising a second wall, a flange with an aperture sized to pass the spring therethrough, a second open end and a second hollow interior, the second hollow interior sized to receive the first wall therewithin, and a third housing comprising a third wall, a third open end, a second extremity, a third hollow interior, a spring disposed within each of the first, second and third hollow interiors between the first extremity and the second extremity, the first and the second housings configured for a reciprocal linear movement relative to each other between a first position where the first open end being disposed at a distance from the flange and a second position where the first open end being disposed in a direct contact with the flange, the spring extending past the first open end when the first housing is disposed at least in the first position.

Embodiment D

A spring comprises a pad and a plate. The pad comprises a first surface, a second surface, the second surface being spaced apart from the first surface to define a thickness of the pad, a peripheral edge surface, and an elastomeric material. The plate comprises a pair of surfaces spaced apart from each other to define a thickness of the plate, apertures through the thickness of the plate and a metallic material, each surface being flat and smooth, the plate being void of any projections on each of the pair of surfaces.

Embodiment E

A railcar yoke comprises two walls defining an open front end shaped and sized to receive a coupler shank therethrough, an aperture through two walls in the open end, a rear wall opposite the open end along a length of the yoke, the rear wall comprising an abutment on one surface of the rear wall, the abutment extending in a direction away from the open front end, the abutment having a hollow interior, and two straps connecting the two walls with the rear wall and defining a cavity of the yoke, the cavity being in an open communication with the open front end.

Embodiment F

A railcar yoke comprises four walls defining an open front end, the open front end shaped and sized to receive a coupler shank therethrough, an elongated closed through two walls from the four walls, a rear wall opposite the open end along a length of the yoke, the rear wall comprising an abutment on one surface of the rear wall, the abutment extending in a direction away from the open front end, the abutment having a hollow interior, and two straps connecting remaining two walls from the four walls with the rear wall and defining a cavity of the yoke, the cavity being in an open communication with the open front end.

Embodiment G

A device comprises a railcar yoke comprising an open front end, a rear wall, two straps connecting the open front end with the rear wall, and an aperture through the open front end, a housing extending outwardly from an exterior surface of the rear wall, the housing comprising a wall defining a hollow interior, a rigid plate disposed at a distance from a distal end of the wall, the wall and the rigid plate being configured for a reciprocal movement relative to each other, and a spring disposed within the hollow interior and in a direct contact with each of the rear wall of the yoke and the rigid plate.

A feature of this embodiment is that the device further comprises another housing being rigidly coupled to the wall, the another housing comprising another hollow interior being sized to receive an exterior surface of the housing therewithin.

A feature of this embodiment is that the device further comprises a rod, and wherein the spring and the wall comprise aligned apertures sized to pass the rod therethrough.

A feature of this embodiment is that the housing is integrated with the yoke as a one-piece member.

A feature of this embodiment is that the device further comprises another plate disposed at a proximal end of the housing, the another plate being in a surface-to-surface contact with the exterior surface of the rear wall of the yoke.

A feature of this embodiment is that the yoke comprises a cavity between the open front end and the rear wall and wherein the device further comprises a railway coupler follower disposed within the cavity adjacent the open front end and another spring disposed within the cavity between the railway coupler follower and the rear wall.

Embodiment H

A device comprises a railcar yoke comprising an open front end configured to receive therewithin a shank of a coupler, a rear wall, two straps connecting the open front end with the rear wall and defining a yoke cavity between the open front end and the rear wall, a first aperture through wall thicknesses in the open front end and a second aperture through a thickness of the rear wall, a coupler follower disposed within the yoke cavity adjacent the open front end and in a direct contact with an end of the shank, a draft pack disposed within the cavity between the coupler follower and the rear wall to absorb each of a buff load and a draft load from a railcar through the coupler, and a buff pack disposed external to the rear wall to absorb the buff load, the buff pack comprises a first housing comprising a first wall, a first extremity, a first open end, a first hollow interior and a first aperture through a thickness of the first extremity, the third aperture being aligned with the second aperture, a second housing comprising a second wall, a second extremity, a second open end, a second hollow interior, and a second aperture through a thickness of the second extremity, the second wall sized to receive the first wall therewithin, a spring disposed within each of the first and second hollow interiors between the first extremity and the second extremity, the spring comprising a stack of elastomeric pads and rigid plates interposed between the elastomeric pads, and aligned apertures in each elastomeric pad and in each rigid plate, and a rod passed through aligned apertures in the spring and the first and second apertures, the rod comprising an abutment sized and shaped to be received within the first aperture, the first and second housings being configured for a reciprocal linear movement relative to one another between a first position where the first open end being disposed at a distance from the second extremity and a second position where the first open end being disposed in a direct contact with the second extremity.

A feature of this embodiment is that the device further comprises an accelerometer on the buff pack, the accelerometer configured to measure an acceleration of the railcar.

A feature of this embodiment is that the device further comprises a velocity sensor, the velocity sensor configured to measure a velocity of the railcar.

A feature of this embodiment is that the device further comprises a strain gage, the strain gage configured to measure an impact force from the railcar.

Embodiment I

A method comprises installing a compressible and a resilient spring within hollow interiors of two housings configured for a reciprocal linear movement relative to one another, and compressing the compressible and resilient spring, to cushion a load applied to an extremity of one housing from the two housings.

A feature of this embodiment is that the method may further comprise contacting an extremity of one housing with an open end of another housing to prevent an over-compression of the compressible and resilient spring.

Embodiment J

A method comprises configuring a first rigid housing with a first hollow interior to be received within a second hollow interior of a second rigid housing for a reciprocal linear movement relative to one another, installing a compressible and a resilient spring within first and second hollow interiors, compressing the compressible and resilient spring, to cushion a load applied to an end of one rigid housing from the first and second rigid housings, and transferring the load through a direct contact between an extremity of one rigid housing with an open end of another rigid housing when the load exceeds designed cushioning capacity of the compressible and resilient spring.

Embodiment K

A method comprises cushioning, with a first device positioning within a railcar yoke, buff and draft loads from a railcar coupled to the yoke, and cushioning, with a spring mounted behind a rear wall of the railcar yoke and within hollow interiors of two housings that are configured for a reciprocal telescoping movement relative to one another, the buff loads from the railcar Embodiment L A method comprises installing a spring within hollow interiors of two housings configured for a reciprocal linear movement of about 6¾ inches relative to one another within a railcar sill pocket of about 38¾ inches, and compressing the compressible and resilient spring, to cushion a repeated load of about 950,000 pounds applied to an end of one housing from the two housings.

Embodiment M

A method comprises installing a spring within hollow interiors of two housings configured for a reciprocal linear movement of about 9¾ inches relative to one another within a railcar sill pocket of about 48¾ inches, and compressing the compressible and resilient spring, to cushion a repeated load of about 950,000 pounds applied to an end of one housing from the two housings.

Embodiment N

A method comprises installing, within a railcar sill pocket of 48¾ inches, two springs with elastomeric pads and rigid plates, each spring disposed within hollow interiors of two housings, where one of the housings is designed to achieve a reciprocal linear movement of at least 6¾ inches, and absorbing, with the springs, a repeated dynamic buff load of at least 600,000 pounds applied to an end of one housing from the two housings.

A feature of this embodiment is that one of the springs may be designed with 21 elastomeric pads, each with an initial thickness of 1¹¹⁄₁₆ inches and another spring may be designed with 10 pads, each with an initial thickness of 1¹¹⁄₁₆ inches.

Embodiment P

A method comprises installing a first device with 10 elastomeric pads and rigid plates into a railcar yoke, installing a second device with 21 elastomeric pads and rigid plates into the railcar yoke, separating the first and second devices with a rigid plate positioned within the yoke to contact intermediate stops in a railcar sill, absorbing (cushioning), with the first and second devices, a repeated dynamic buff load of at least 600,000 pounds applied axially to the first and second devices through a railcar coupler connectable to the yoke, and preventing over-compression of the elastomeric pads within each of the first and second devices with telescoping housings at least partially encasing the elastomeric pads within the first and second devices.

Embodiment Q

A method comprises installing a first device with 10 elastomeric pads and rigid plates into a railcar yoke, installing a second device with 21 elastomeric pads and rigid plates adjacent the railcar yoke and behind a tail wall of the railcar yoke, compressing the 21 elastomeric springs within the second device to a linear distance of at least 6¾ inches, absorbing (cushioning), with the first and second devices, a repeated dynamic buff load of at least 600,000 pounds applied axially to the first and second devices through a railcar coupler connectable to the yoke, and preventing over-compression of the elastomeric pads within the second device with a telescoping housing at least partially encasing the 21 elastomeric pads.

The chosen embodiments of the subject matter have been described and illustrated, to plan and/or cross section illustrations that are schematic illustrations of idealized embodiments, for practical purposes so as to enable any person skilled in the art to which it pertains to make and use the same. As such, variations from the shapes of the illustrations as a result, for example, of manufacturing techniques and/or tolerances, are to be expected. It is therefore intended that all matters in the foregoing description and shown in the accompanying drawings be interpreted as illustrative and not in a limiting sense. For example, a region illustrated or described as flat may, typically, have rough and/or nonlinear features. Moreover, share angles that are illustrated may be rounded and rounded angles may be sharp. Thus, the regions illustrated in the figures are schematic in nature and their shapes are not intended to illustrate the precise shape of a region and are not intended to limit the scope of the present claims. It will be understood that variations, modifications, equivalents and substitutions for components of the specifically described embodiments may be made by those skilled in the art without departing from the spirit and scope of the invention as set forth in the appended claims.

It should be appreciated that reference throughout this specification to "an embodiment" means that a particular feature, structure or characteristic described in connection with the embodiment is included in at least one embodiment of the disclosed subject matter. The particular features, structures or characteristics may be combined as suitable in one or more embodiments of the disclosed subject matter. Each embodiment may be employed alone or in any combination, and may include any one or more of the above features in any suitable combination.

Unless otherwise indicated, all numbers expressing quantities of elements, optical characteristic properties, and so forth used in the specification and claims are to be understood as being modified in all instances by the term "about." The term "about" may be associated with a numerical value to indicate a margin of +/−20% of the value. Accordingly, unless indicated to the contrary, the numerical parameters set forth in the preceding specification and attached claims are approximations that can vary depending upon the desired properties sought to be obtained by those skilled in the art utilizing the teachings of the present subject matter. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the claimed subject matter are approximations, the numerical values set forth in the specific examples are reported as precisely as possible.

Any numerical value, however, inherently contains certain errors necessarily resulting from the standard deviations found in their respective testing measurements.

To the extent that the appended claims have been drafted without multiple dependencies, this has been done only to accommodate formal requirements in jurisdictions which do not allow such multiple dependencies or require extra claim fees for such multiple dependencies. It should be noted that all possible combinations of features which would be implied by rendering the claims multiply dependent are explicitly envisaged and should be considered part of the invention.

Anywhere the term "comprising" is used, embodiments and components "consisting essentially of" and "consisting of" are expressly disclosed and described herein."

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

The Abstract is not intended to be limiting as to the scope of the claimed subject matter and is for the purpose of quickly determining the nature of the claimed subject matter.

What is claimed is:

1. A device, comprising:
    a housing comprising:
        a first extremity,
        a second extremity opposite the first extremity along a length of the device defined by first and second extremities,
        a wall, the wall having a first edge at the first extremity and a second edge disposed at a distance from the second extremity, the wall partially extending along the length and defining a hollow interior, and
        an elongated projection disposed on and extending from an interior surface of one of the first and second extremities into the hollow interior; and
    a spring at least partially disposed within the hollow interior in a direct contact with at least one extremity from the first and second extremities, the spring at least including aligned axial apertures sized and shaped to receive a peripheral surface of the elongated projection therethrough.

2. The device of claim 1, wherein the spring comprises:
    a pad, the pad comprising:
        a first surface,
        a second surface, the second surface being spaced apart from the first surface to define a thickness of the pad,
        a peripheral edge surface,
        a first axial aperture from aligned axial apertures, and
        an elastomeric material; and
    a plate, the plate comprising a pair of surfaces spaced apart from each other to define a thickness of the plate, apertures through the thickness of the plate, a second axial aperture, from aligned axial apertures, through the thickness of the plate and a metallic material, the plate excludes any projections on each of the pair of surfaces.

3. The device of claim 2, wherein each surface of the plate comprises a smooth surface.

4. The device of claim 1, wherein the housing comprises:
    a first housing comprising a first wall, the first extremity, a first open end and a first hollow interior; and
    a second housing comprising a second wall, the second extremity, a second open end and a second hollow interior, the second hollow interior sized to receive the first wall therewithin;
    the first and second housings designed for a reciprocal linear movement relative to each other between a first position where the first open end being disposed at the distance from the second extremity and a second position where the first open end being disposed in a direct contact with the second extremity;
    the spring extending past the first open end when the first housing is disposed in the first position.

5. The device of claim 1, wherein the housing comprises:
    a first housing comprising a first wall, the first extremity, a first open end and a first hollow interior;
    a second housing comprising a second wall, a flange with an aperture sized to pass the spring therethrough, a second open end and a second hollow interior, the second hollow interior sized to receive the first wall therewithin; and
    a third housing comprising a third wall, a third open end, the second extremity, a third hollow interior;
    the first wall designed for a reciprocal linear movement within the second hollow interior between a first position where the first open end being disposed at a distance from the flange and a second position where the first open end being disposed in a direct contact with the flange;
    the spring extending past the first open end and past the flange.

6. The device of claim 1, wherein the first and second extremities configured to move between a first position where an end of the wall being closest to the second extremity being disposed at a distance from the second extremity and a second position where the end of the wall being disposed in a direct contact with the second extremity.

7. The device of claim 1, further comprising a sensor positioned and operable to sense the wall adjacent the second edge thereof.

8. The device of claim 1, further comprising a railcar yoke, the railcar yoke comprising:
two walls defining an open end shaped and sized to receive a coupler shank therethrough;
an aperture through two walls in the open end;
a rear wall opposite the open end along a length of the railcar yoke; and
two straps connecting the two walls with the rear wall and defining a cavity of the railcar yoke, the cavity being in an open communication with the open end;
the first extremity being in a direct contact with the rear wall.

9. The device of claim 1, further comprising a railcar yoke, the railcar yoke comprising:
four walls defining an open end, the open end shaped and sized to receive a coupler shank therethrough;
an elongated closed slot through two walls from the four walls;
a rear wall opposite the open end along a length of the railcar yoke; and
two straps connecting remaining two walls from the four walls with the rear wall and defining a cavity of the railcar yoke, the cavity being in an open communication with the open end;
the first extremity being disposed in a direct contact with the rear wall.

10. The device of claim 1, wherein the first extremity and the wall are configured to move between a first position where the second edge of the wall being closest to the second extremity being disposed at a distance from the second extremity and a second position where the second edge of the wall being disposed in a direct contact with the second extremity.

11. A device, comprising:
a first housing comprising a first wall, a first closed end, a first open end and a first hollow interior;
a second housing comprising a second wall, a second closed end, a second open end and a second hollow interior, the second hollow interior sized to receive the first wall therewithin; and
a spring disposed within each of first and second hollow interiors between the first closed end and the second closed end, the spring including elastomeric units disposed in a series with each other, each elastomeric unit configured with an elastomeric pad and a rigid plate disposed in a surface to surface contact with the elastomeric pad, the rigid plate having apertures through a thickness of the rigid plate, the thickness defined by a pair of surfaces spaced apart from each other, and excluding any projections on each surface from the pair of surfaces;
the first wall designed for a reciprocal linear movement within the second hollow interior between a first position where the first open end being disposed at a distance from the second closed end and a second position where the first open end being disposed in a direct contact with the second closed end;
the spring extending past the first open end when the first housing is disposed in the first position.

12. The device of claim 11, further comprising:
aligned axial apertures in the first closed end, the second closed end, the elastomeric pad and the rigid plate; and
a rod at least passing through the aligned axial apertures in the elastomeric pad and the rigid plate of the each elastomeric unit.

13. The device of claim 12, wherein the rod comprises an abutment on one end and a thread on another end and wherein an axial aperture in one of first and second closed ends being sized and shaped to receive the abutment therewithin and wherein an axial aperture in another one of the first and second closed ends being sized and shaped to pass the rod therethrough so that the thread extends external to the another one of the first and second closed ends.

14. The device of claim 11, wherein the second housing comprises an abutment on an exterior surface mediate the second open end and the second closed end.

15. The device of claim 11, wherein the first wall is sized and shaped to fit within the second wall and wherein the spring is designed to compress sufficient for the first open end to contact a surface of the second closed end.

16. The device of claim 11, further comprising a sensor mounted in an aperture through a thickness of the second wall adjacent the second closed end, the sensor configured to sense a presence or an absence of the first wall adjacent the first open end.

17. The device of claim 16, further comprising a control unit coupled to the sensor, the control unit comprises:
a control circuit with a sensor input, the sensor being connected to the sensor input;
a communication circuit coupled to the control circuit; and
a battery, the sensor, the control circuit and the communication circuit being coupled to the battery.

18. The device of claim 11, further comprising a sensor mounted in an aperture through a thickness of the second closed end, the sensor configured to sense the direct contact between the first open end and the second closed end.

19. The device of claim 11, wherein one of the first and second closed ends includes an elongated projection extending into the at least one hollow interior from first and second hollow interiors and wherein the spring further includes aligned axial apertures sized and shaped to receive a peripheral surface of the elongated projection therethrough.

20. The device of claim 11, further comprising:
a cavity in one of an exterior surface of the first wall and an interior surface of the second wall; and
a lubricating insert configured to be positioned within the cavity.

21. The device of claim 11, further comprising a railcar yoke with a yoke cavity, the yoke cavity being sized to receive the device therewithin.

22. The device of claim 11, further comprising aligned axial apertures in the elastomeric pad and the rigid plate, an axial aperture in the rigid plate being larger than remaining apertures in the rigid plate.

23. A device, comprising:
a railcar yoke comprising an open front end designed to receive therewithin a shank of a coupler, a rear wall, two straps connecting the open front end with the rear wall and defining a yoke cavity between the open front end and the rear wall, a first aperture through wall thicknesses in the open front end and a second aperture through a thickness of the rear wall;
a coupler follower disposed within the yoke cavity adjacent the open front end and in a direct contact with an end of the shank;

a draft pack disposed within the yoke cavity between the coupler follower and the rear wall to absorb each of a buff load and a draft load from a railcar through the coupler; and a buff pack disposed external to the rear wall to absorb the buff load, the buff pack comprising:
  a first housing comprising a first wall, a first extremity, a first open end, a first hollow interior and a first aperture through a thickness of the first extremity,
  a second housing comprising a second wall, a second extremity, a second open end, a second hollow interior, and a second aperture through a thickness of the second extremity, the second wall sized to receive the first wall therewithin,
  a spring disposed within each of first and second hollow interiors between the first extremity and the second extremity, the spring comprising a stack of elastomeric pads and rigid plates at least interposed between the elastomeric pads, the spring further comprising aligned axial apertures in each elastomeric pad and in each rigid plate and apertures in the each rigid plate around a respective axial aperture, the each rigid plate excluding any projections on each of a pair of surfaces of the each rigid plate, and
  a rod passed through aligned apertures in the spring and through the second aperture, the rod comprising an abutment sized and shaped to be received within the first aperture,
  first and second housings being designed for a reciprocal linear movement relative to one another between a first position where the first open end being disposed at a distance from the second extremity and a second position where the first open end being disposed in a direct contact with the second extremity.

24. A device, comprising:
a housing at least including:
  a first extremity,
  a second extremity opposite the first extremity along a length of the device defined by first and second extremities,
  a wall, the wall having a first edge at the first extremity and a second edge disposed at a distance from the second extremity, the wall partially extending along the length and defining a hollow interior; and
a spring at least partially disposed within the hollow interior in a direct contact with at least one extremity from the first and second extremities; and
a sensor positioned and operable to sense a presence or an absence of a contact between the wall and the second extremity.

25. A device, comprising:
a first housing at least including a first wall, a first closed end, a first open end and a first hollow interior;
a second housing at least including a second wall, a flange with an aperture, a second open end and a second hollow interior, the second hollow interior sized to receive the first wall therewithin;
a third housing at least including a third and wall, a third open end, a second closed end, and a third hollow interior;
a spring being disposed within each of the first hollow interior, the second hollow interior and the third hollow interior and in a direct contact with each of first and second closed ends, the spring being sized to pass through the aperture;
the first wall designed for a reciprocal linear movement within the second hollow interior between a first position where the first open end being disposed at a distance from the flange and a second position where the first open end being disposed in a direct contact with a portion of the flange.

26. The device of claim 25, further comprising:
axial apertures in the first closed end, the second closed end, and the spring;
a rod, the rod at least including:
  a peripheral surface sized to pass through apertures in the second closed end and the spring,
  an abutment on one end of the rod, the abutment sized to be received within an axial aperture in the first closed end, and
  a thread on another end of the rod, the thread extending external to the second closed end; and
a nut in a threaded engagement with the thread on the rod.

27. A device, comprising:
a first housing comprising a first wall, a first closed end, a first open end and a first hollow interior;
a second housing comprising a second wall, a second closed end, a second open end and a second hollow interior, the second hollow interior sized to receive the first wall therewithin; and
a spring disposed within each of first and second hollow interiors between the first closed end and the second closed end, the spring including elastomeric units disposed in a series with each other, each elastomeric unit configured with an elastomeric pad and a rigid plate disposed in a surface to surface contact with the elastomeric pad, the rigid plate having apertures through a thickness of the rigid plate, the thickness defined by a pair of surfaces spaced apart from each other, and excluding any projections on each surface from the pair of surfaces, the elastomeric pad and the rigid plate further having axial apertures sized to receive a peripheral surface of a projection therethrough, the projection extending from an interior surface of at least one closed end from first and second closed ends.

* * * * *